US 6,460,987 B1

(12) United States Patent
Katsuragi et al.

(10) Patent No.: US 6,460,987 B1
(45) Date of Patent: Oct. 8, 2002

(54) INK SET FOR INK-JET RECORDING, INK-JET RECORDING METHOD, RECORDING UNIT, INK-JET RECORDING APPARATUS AND BLEEDING REDUCING METHOD

(75) Inventors: Ryuji Katsuragi, Tokyo (JP); Koromo Shirota, Kawasaki (JP); Teruo Ozaki, Yokohama (JP); Masahiko Kubota, Tokyo (JP); Hidehiko Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/678,727

(22) Filed: Oct. 4, 2000

(30) Foreign Application Priority Data

Oct. 5, 1999 (JP) ............................ 11-284962

(51) Int. Cl.⁷ .............................................. G01D 11/00
(52) U.S. Cl. ........................... 347/100; 347/96; 347/99; 347/101
(58) Field of Search ........................ 347/100, 99, 101, 347/96; 106/31.58, 31.32

(56) References Cited

U.S. PATENT DOCUMENTS

| 4,804,411 A | 2/1989 | Eida et al. .................... 106/22 |
| 4,864,324 A | 9/1989 | Shirota et al. ................ 346/1.1 |
| 5,059,246 A | 10/1991 | Yamamoto et al. ........... 106/22 |
| 5,074,914 A | 12/1991 | Shirota et al. ................ 106/22 |
| 5,123,960 A | 6/1992 | Shirota et al. ................ 106/22 |
| 5,135,570 A | 8/1992 | Eida et al. .................... 106/22 |
| 5,135,571 A | 8/1992 | Shirota et al. ................ 106/22 |
| 5,139,573 A | 8/1992 | Yamamoto et al. ........... 106/22 |
| 5,141,558 A | 8/1992 | Shirota et al. ................ 106/22 |
| 5,190,581 A | 3/1993 | Fukushima et al. ........ 106/20 D |
| 5,198,023 A | 3/1993 | Stoffel ....................... 106/22 R |
| 5,216,437 A | 6/1993 | Yamamoto et al. ........... 346/1.1 |
| 5,220,347 A | 6/1993 | Fukushima et al. .......... 346/1.1 |
| 5,248,991 A | 9/1993 | Shirota et al. ................ 346/1.1 |
| 5,258,066 A | 11/1993 | Kobayashi et al. ........ 106/22 R |
| 5,296,022 A | 3/1994 | Kobayashi et al. ....... 106/20 D |
| 5,329,305 A | 7/1994 | Fukushima et al. ........... 347/95 |
| 5,427,611 A | 6/1995 | Shirota et al. ............. 106/22 A |
| 5,451,251 A | 9/1995 | Mafune et al. ........... 106/22 H |
| 5,536,306 A | 7/1996 | Johnson et al. ........... 106/22 R |
| 5,540,764 A | 7/1996 | Haruta et al. ............. 106/20 R |
| 5,614,007 A | 3/1997 | Kurabayashi et al. ..... 106/22 R |
| 5,640,187 A | 6/1997 | Kashiwazaki et al. ....... 347/101 |
| 5,658,376 A | 8/1997 | Noguchi et al. .......... 106/31.43 |
| 5,696,182 A | 12/1997 | Kashiwazaki et al. ....... 523/161 |
| 5,700,314 A | 12/1997 | Kurbayashi et al. ..... 106/31.27 |
| 5,734,403 A | 3/1998 | Suga et al. ................... 347/101 |
| 5,781,216 A | 7/1998 | Haruta et al. ................ 347/106 |
| 5,792,249 A | 8/1998 | Shirota et al. ............ 106/31.27 |
| 5,900,899 A | 5/1999 | Ichizawa et al. ............. 347/100 |
| 5,976,233 A * | 11/1999 | Osumi et al. ............. 106/31.86 |
| 6,074,052 A | 6/2000 | Inui et al. .................... 347/101 |
| 6,084,006 A | 7/2000 | Kashiwazaki et al. ....... 523/160 |
| 6,247,808 B1 * | 6/2001 | Ma et al. ..................... 347/100 |

FOREIGN PATENT DOCUMENTS

| EP | 0 586 079 A1 | 3/1994 |
| JP | 55-65269 | 5/1980 |
| JP | 6-57192 | 3/1994 |

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

An ink set for use in an ink-jet recording method for recording a color image on a recording medium using four colors or more of ink, each ink includes a coloring material and a liquid medium, wherein any combination of two different inks causes aggregation of the coloring material by a chemical reaction on mutual contact on a recording medium.

17 Claims, 7 Drawing Sheets

MOVING DIRECTION OF CARRIAGE

INK SET FOR INK-JET RECORDING, INK-JET RECORDING METHOD, RECORDING UNIT, INK-JET RECORDING APPARATUS AND BLEEDING REDUCING METHOD

BACKGROUND OF THE INVENTION

1. Field of the Invention

The present invention relates to an ink set, an ink-jet recording method, a recording unit, an ink-jet recording apparatus and a method for reducing the bleeding in a multi-color image where different-color regions abut each other.

2. Related Background Art

The ink-jet recording method, capable of high speed printing and multi-color printing with less noise, carries out recording by ejecting an ink droplet to attach it to the recording medium such as paper, where the ink droplet is generated by various processes such as the electrostatic suction process by applying a high voltage, the process using a piezoelectric element to give a mechanical vibration or displacement to ink and the process heating ink to form a bubble to use its pressure (so-called bubble jet process).

When a color image is formed on a recording medium such as plain paper or bond paper, however, the above conventional ink-jet recording method often cannot provide a satisfying image because of a phenomenon called bleeding (color blurring or uneven ink mixing at the boundary of different color images) as a result of applying color inks one after another before ink fixation.

As means for solving such problems, Japanese Patent Application Laid-Open No. 55-65269 describes the use of an ink added with a compound for enhancing the penetrability such as a surfactant, and Japanese Patent Application Laid-Open No. 06-57192 describes an ink-jet recording ink set capable of preventing bleeding, which is comprised of a black ink containing at least one anionic dye and a yellow ink containing at least one cationic dye and a polyvalent precipitant.

However, when a penetrability-enhancing compound such as a surfactant is added to the ink as disclosed in Japanese Patent Application Laid-Open No. 55-65269, ink penetration is enhanced and bleeding is suppressed to a certain extent, but there arises a problem such that the ink penetrates deep into the recording medium along with the coloring agent so that the image density becomes low. Besides, since the wettability to the surface of a recording medium is increased, the ink tends to spread on the surface sometimes resulting in low resolution and low printing grade. With the ink-jet ink set described in above Japanese Patent Application Laid-Open No.6-57192, in which the black ink contains at least one anionic dye as a coloring agent and the yellow ink contains at least one cationic dye and a polyvalent precipitant, bleeding between black ink and yellow ink is suppressed to a considerable extent but bleeding between cyan ink and magenta ink, cyan ink and black ink, and magenta ink and black ink is not solved.

SUMMARY OF THE INVENTION

It is an object of the present invention to solve the above problems in the conventional art and to provide an ink set of three colors or more, capable of reducing the bleeding in a color image, forming a clear color image and improving the printing grade on a recording medium, as well as to provide an ink-jet recording method and ink-jet recording apparatus using the ink set.

According to one aspect of the present invention, there is provided an ink set for ink-jet recording of a color image on a recording medium by using three color inks, comprising:

(1) a first ink comprising a monohydric alcohol and an anionic dye which aggregates on contact with a polyvalent metal salt;

(2) a second ink comprising a polyvalent metal salt and an anionic dye which does not aggregate on contact with the polyvalent metal salt; and (3) a third ink comprising a cationic dye, or a pigment and a dispersant.

According to another aspect of the invention, there is provided an ink set for ink-jet recording of a color image on a recording medium by using four color inks or more, comprising:

(1) a first ink comprising a self-dispersible carbon black with a cationic hydrophilic group directly or through another atomic group bonded to the surface thereof;

(2) a second ink comprising a monohydric alcohol and an anionic dye which aggregates when the second ink contacts with a liquid containing a polyvalent metal ion;

(3) a third ink comprising a polyvalent metal ion and an anionic dye which does not aggregate even when coexisting with the polyvalent metal ion; and (4) a fourth ink comprising a pigment and an anionic dispersant for dispersing the pigment in the liquid.

According to a further aspect of the invention, there is provided an ink set for an ink-jet recording of a color image on a recording medium by using four color inks or more, comprising:

(1) a first ink comprising a self-dispersible carbon black with a cationic hydrophilic group bonded to the surface thereof directly or through another atomic group;

(2) a second ink comprising an anionic dye which aggregates when the second ink contacts with a liquid containing a polyvalent metal ion;

(3) a third ink comprising a polyvalent metal salt and an anionic dye which does not aggregate even when coexisting with a polyvalent metal ion; and (4) a fourth ink comprising a cationic dye and a monohydric alcohol.

According to a still further aspect of the invention, there is provided an ink-jet recording method for forming a multi-color image comprising a step of:

ejecting respective three color inks by an ink-jet process, wherein the three inks correspond to the first ink, the second ink and the third ink constituting the above three color ink set.

According to a still further aspect of the invention, there is provided an ink-jet recording method for forming a multi-color image comprising a step of:

ejecting respective four color inks by an ink-jet process, wherein the four inks correspond to the first ink, the second ink, the third ink and the fourth ink constituting one of the above four color ink sets.

According to a still further aspect of the invention, there is provided a recording unit comprising: a first ink container, a second ink container and a third ink container respectively containing the first ink, the second ink and the third ink constituting an ink set and an ink-jet head for ejecting the ink contained in each ink container.

According to a still further aspect of the invention, there is provided a recording unit comprising: a first ink container, a second ink container, a third ink container and a fourth ink container containing the first ink, the second ink, the third ink and the fourth ink constituting one of the above four color ink sets and an ink-jet head for ejecting the ink contained in each ink container.

According to a still further aspect of the invention, there is provided an ink-jet recording apparatus comprising: a first ink container, a second ink container and a third ink container respectively containing the first inks the second ink and the third ink constituting the above three color ink set, and an ink-jet head for ejecting the ink contained in each ink container.

According to a still further aspect of the invention, there is provided an ink-jet recording apparatus comprising: a first ink container, a second ink container, a third ink container and a fourth ink container respectively containing the first ink, the second ink, the third ink and the fourth ink constituting one of the above four color ink sets and an ink-jet head for ejecting the ink contained in each ink container.

According to a still further aspect of the invention, there is provided a method for alleviating bleeding in a multi-color image where different color regions are adjacent to each other, wherein the images formed with at least two color inks among three color inks respectively corresponding to the first ink, the second ink and the third ink constituting the above three color ink set.

According to a still further aspect of the invention, there is provided a method for alleviating bleeding in a multi-color image where different color regions are adjacent to each other, wherein the images are formed with at least two of four color inks respectively corresponding to the first ink, the second ink, the third ink and the fourth ink constituting one of the above four color ink sets.

DETAILED DESCRIPTION OF THE PREFERRED EMBODIMENTS

Figure 1:
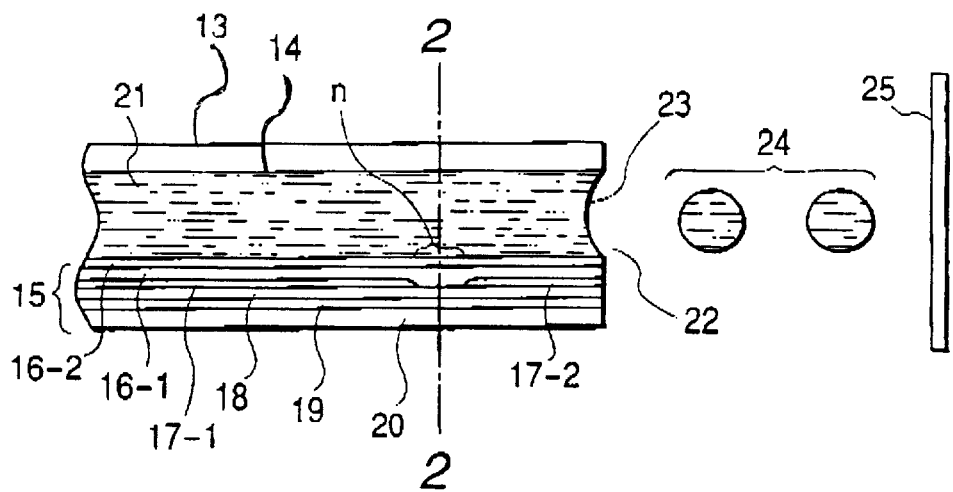
FIG. 1 is a vertical sectional view of one example of the head in an ink-jet recording apparatus.

The present invention will be described in more detail with reference to the embodiments.

The inventors of the present invention have found out that the use of the following ink sets for recording color images on the recording medium can very effectively alleviate bleeding between all colors.

<First Aspect>

According to the first aspect of the present invention, the ink-jet recording ink set for recording images on a recording medium comprises inks of at least four colors, and following are specific examples of Ink sets A and B.

A) An ink set comprising:
   (1) a first ink containing a self-dispersible carbon black having a cationic hydrophilic group directly or through another atomic group bonded to the surface thereof;
   (2) a second ink containing a monohydric alcohol and an anionic dye which aggregates when the second ink contacts with a liquid containing a polyvalent metal ion;
   (3) a third ink containing a polyvalent metal ion salt and an anionic dye which does not aggregate even when coexisting with a polyvalent metal ion; and
   (4) a fourth ink containing a pigment and an anionic dispersant for dispersing it into a liquid.

B) An ink set comprising:
   (1) a first ink containing a self-dispersible carbon black with a cationic hydrophilic group directly or through another atomic group bonded to the surface thereof;
   (2) a second ink containing an anionic dye which aggregates when the second ink contacts with a liquid containing a polyvalent metal ion;
   (3) a third ink containing a polyvalent metal ion and an anionic dye which does not aggregate even on contact with a polyvalent metal ion; and
   (4) a fourth ink containing a cationic dye and a monohydric alcohol.

The above ink set A works as follows.

When the first ink and any one of the other inks come into contact, the self-dispersible carbon black contained in the first ink as a coloring material aggregates since the polarity of the self-dispersible carbon black having a cationic hydrophilic group bonded directly or through another atomic group to the surface thereof is opposite to that of the anionic dye contained in the second ink and the third ink and the anionic dispersant contained in the fourth ink.

When the second ink and the third ink come into contact, the anionic dye in the second ink aggregates by the action of the polyvalent metal salt contained in the third ink.

When the third ink and the fourth ink come into contact, the dispersion state of the pigment in the fourth ink is ruptured by the action of the polyvalent metal salt in the third ink leading to pigment aggregation.

When the second ink and the fourth ink come into contact, the dispersion state of the pigment in the fourth ink is ruptured due to the dehydrating action of the monohydric alcohol in the second ink leading to pigment aggregation.

In this manner, use of the above ink set A enables the alleviation of bleeding between all colors.

The above ink set B works as follows.

When the first ink and the second or third ink come into contact, the self-dispersible carbon black contained in the first ink as a coloring material aggregates since the polarity of the self-dispersible carbon black having a cationic hydrophilic group bonded directly or through another atomic group to the surface thereof is opposite to that of the anionic dye contained in the second ink and the third ink. When the first ink and the fourth ink come into contact, the dispersion state of the self-dispersible carbon black in the first ink is ruptured due to the dehydrating action of the monohydric alcohol in the fourth ink leading to carbon black aggregation. This mechanism of aggregation is considered as follows: the self-dispersible carbon black is forming so-called hydrophilic colloids in an aqueous medium, and mixed monohydric alcohol acts as a dehydrating agent and deprives water molecules surrounding the colloids, and as a result, the carbon black looses self-dispersibility and aggregates.

When the second ink and the third ink come into contact, the anionic dye in the second ink aggregates by the action of the polyvalent metal salt contained in the third ink.

When the fourth ink comes into contact with the second or third ink, the aggregation of the coloring material occurs by the ionic reaction between anion and cation.

In this manner, use of the above ink set B enables the alleviation of bleeding between all colors.

As described above, with an ink set according to the present invention, coloring material in each ink aggregates by chemical reaction which occurs in all combinations of the inks. Thus, uneven mixing of different inks would not occur to suppress bleeding on the recording medium. Furthermore, use of an ink set according to the present invention results not only in the reduction in bleeding, but also in formation of color images of high optical density and good printing grade on a recording medium because the coloring material in each ink aggregates before diffusing into the recording medium. Besides, since the landed ink droplet would not easily spread on the recording medium, resolution will not be lowered and color images of good color gradation can be obtained on the recording medium.

<Self-Dispersible Carbon Black in the First Ink>

At least one type of cationic hydrophilic groups on the surface of the carbon black of the above first ink is preferably selected from those having the following general formulas:

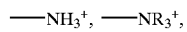
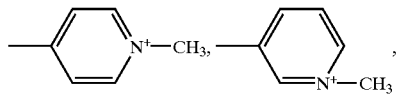
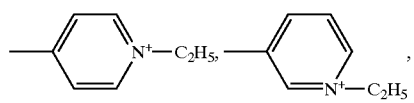
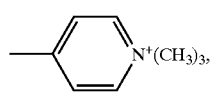
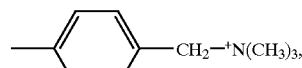
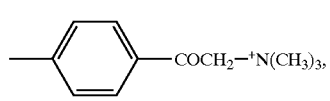
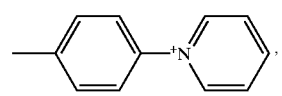

-continued

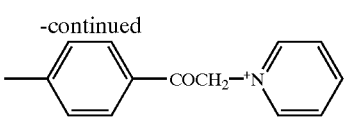

where, R denotes a C1 to C12 alkyl group, a phenyl group which may have a substituent or a naphthyl group which may have a substituent.

As another atomic group, for example, a C1 to C12 alkylene group, a phenylene group which may have a substituent and a naphthylene group which may have a substituent are enumerated. Specific examples of the combination of the above hydrophilic groups and the other group include $—CH_2NH_3^+$, $C_2H_4N^+(CH_3)_3$, $—C_3H_{10}NH_3^+$, $—PhNH_3^+$, but needless to say, the present invention is not limited to these.

The above carbon black is not limited to a single type, but may be a mixture of two or more types to adjust the color tone of the ink. Besides, the added quantity of carbon black in the ink is preferably in a range of 0.1 to 15% by weight, and more preferably 1 to 10% by weight to the total ink weight. In the present invention, a cationic dye may be added to the ink in addition to the self-dispersing carbon black to adjust the color tone of the ink.

<Anionic Dye that Aggregates on Contact with Polyvalent Metal Salt in the Second Ink>

Next described is the anionic dye of the second ink that aggregates on contact with a polyvalent metal salt.

As examples of such anionic dyes, those having the following structural formulae, as well as Projet Fast Cyan 2 (Zeneca, Co.), Projet Fast Magenta 2 (Zeneca, Co.), Projet Fast Yellow 2 (Zeneca, Co.), etc. are enumerated, but the invention is not limited to them.

Exemplary Compound 1

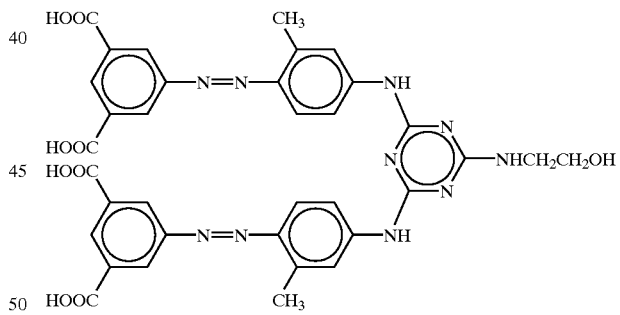

Exemplary Compound 2

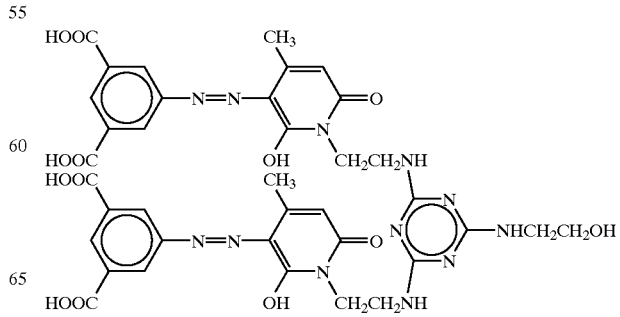

Exemplary Compound 3
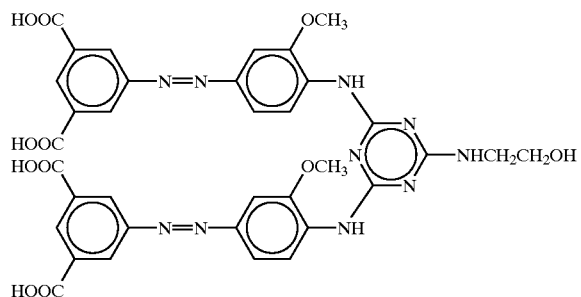
Exemplary Compound 4
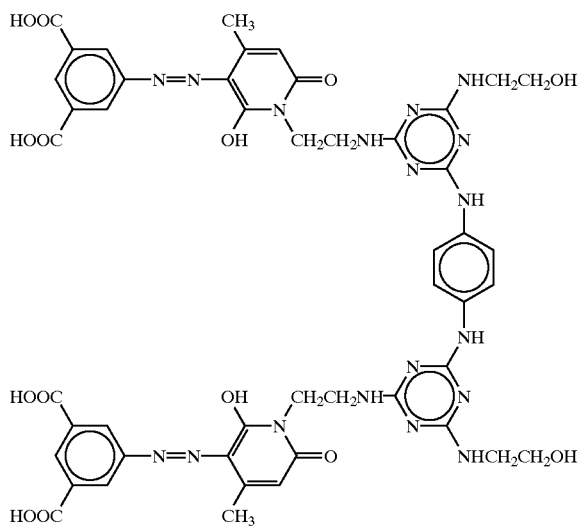
Exemplary Compound 5
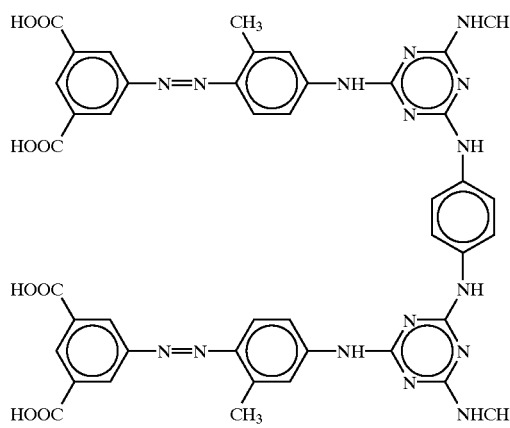
Exemplary Compound 6
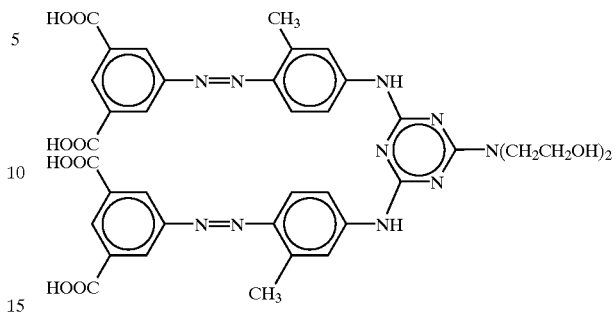
Exemplary Compound 7
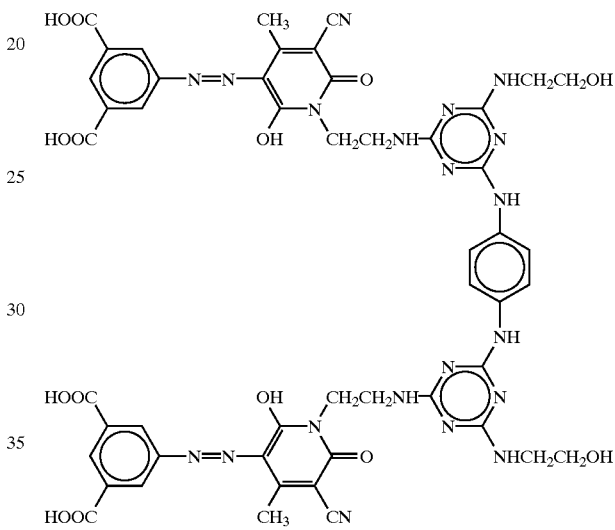
Exemplary Compound 8
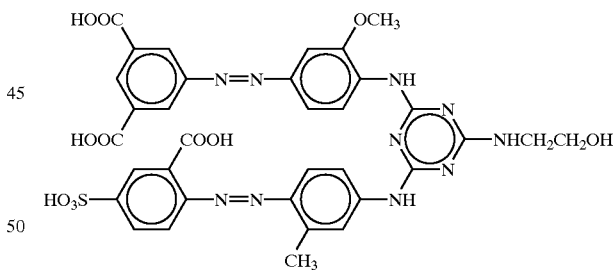
Exemplary Compound 9
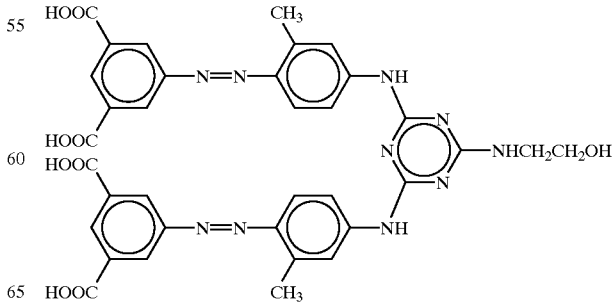

Exemplary Compound 10
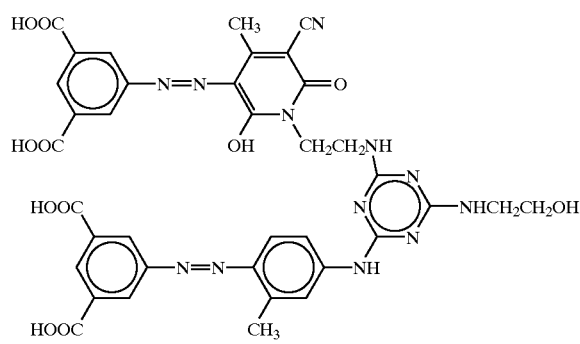
Exemplary Compound 11
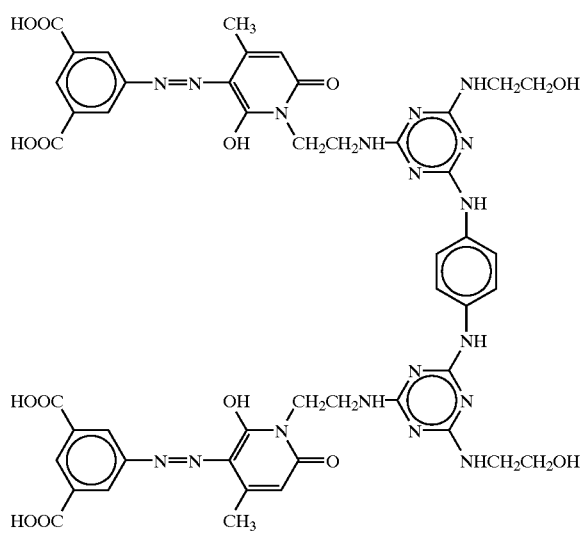
Exemplary Compound 12
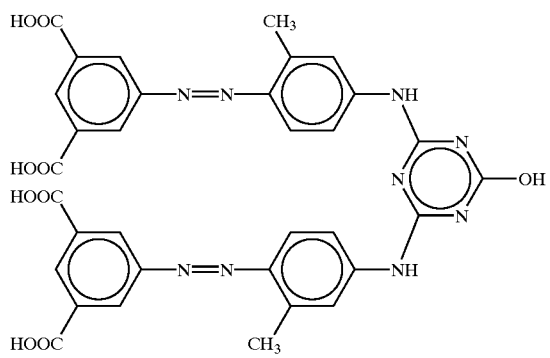
Exemplary Compound 13
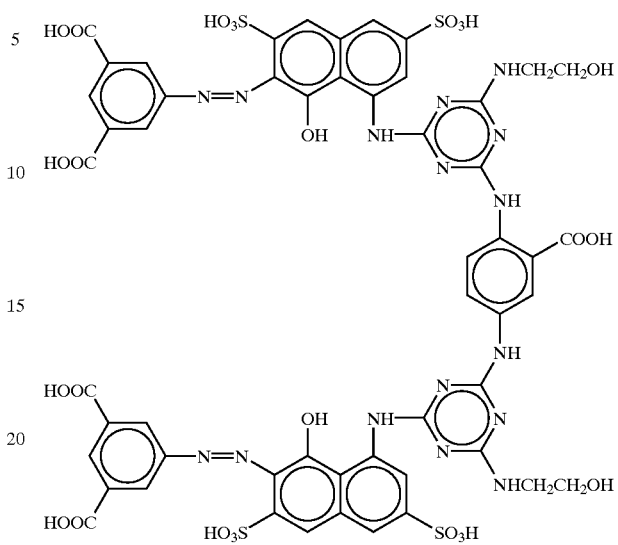
Exemplary Compound 14
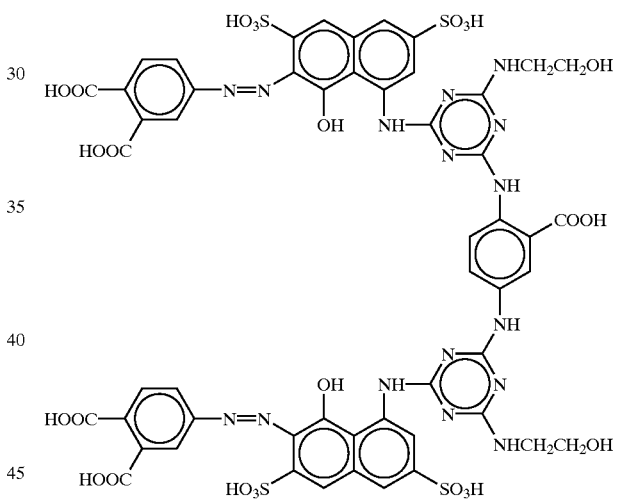
Exemplary Compound 15
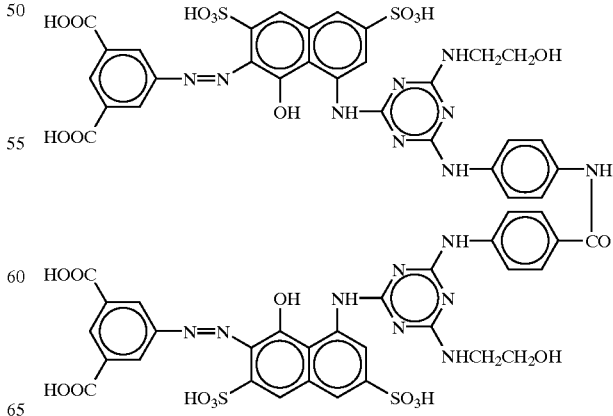

Exemplary Compound 16
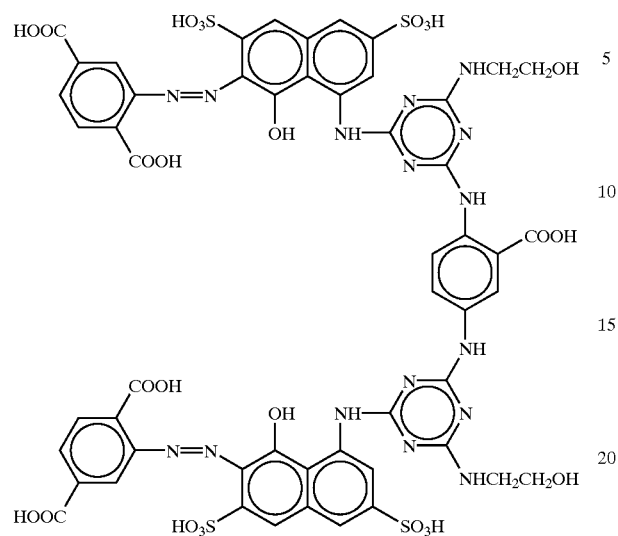
Exemplary Compound 17
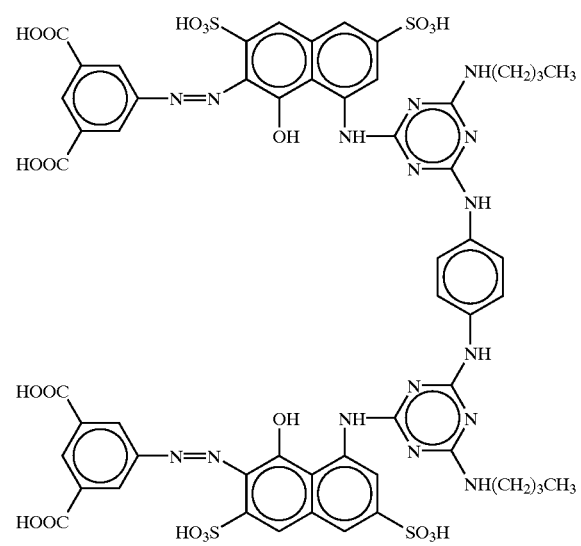
Exemplary Compound 18
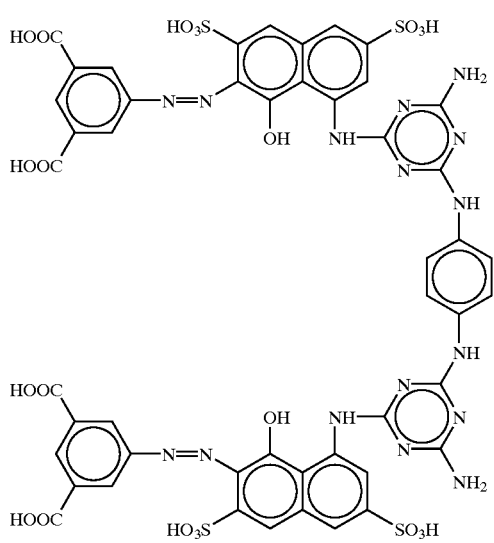
Exemplary Compound 19
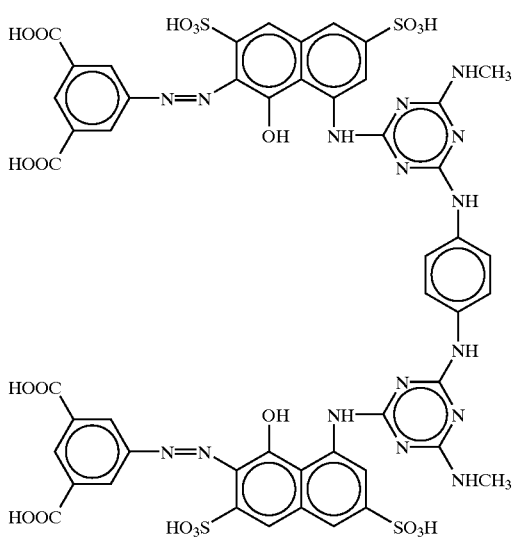
Exemplary Compound 20
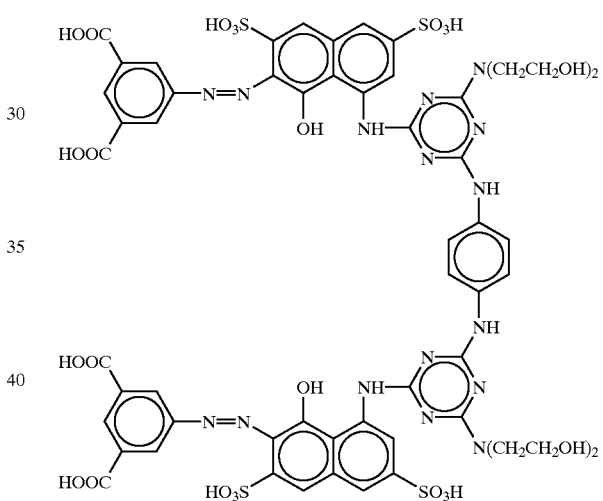
Exemplary Compound 21
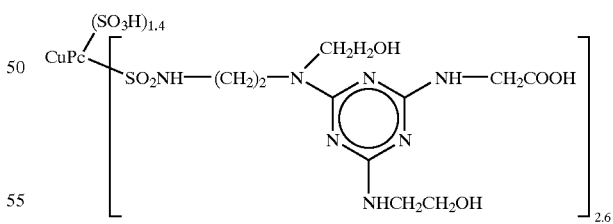
Exemplary Compound 22
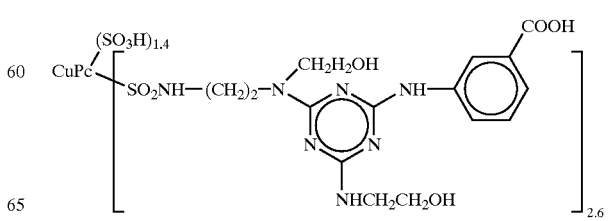

-continued

Exemplary Compound 23

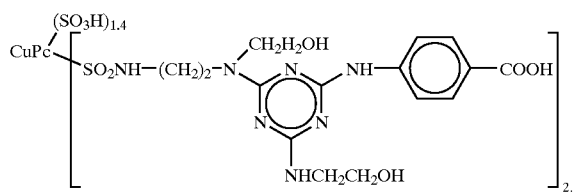

Exemplary Compound 24

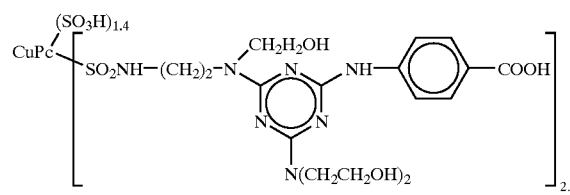

Exemplary Compound 25

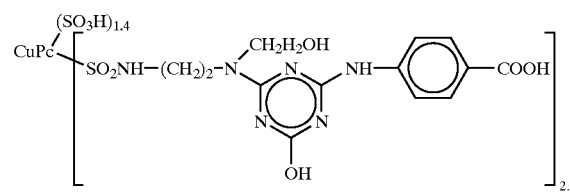

Exemplary Compound 26

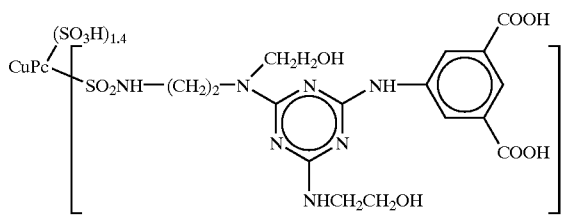

Exemplary Compound 27

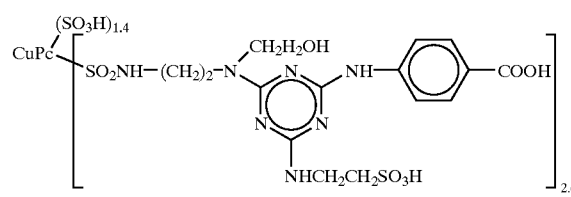

<Anionic Dye That Does Not Aggregate on Contact with a Polyvalent Metal Salt in the Third Ink>

Next, the anionic dye contained in the third ink will be described. Any anionic dye is usable so long as it has a moderate color tone and density and will not aggregate by a chemical reaction with a polyvalent metal salt, whether it is known or newly synthesized.

As examples of such anionic dyes, there are, but not limited to:

C.I. Direct Blue 1, 2, 6, 8, 22, 34, 70, 71, 76, 78, 86, 142, 199, 200, 201, 202, 203, 207, 218, 236, 287;

C.I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225, 227;

C.I. Direct Yellow 1, 2, 4, 8, 11, 12, 26, 27, 28, 33, 34, 41, 44, 48, 86, 87, 88, 132, 135, 142, 144;

C.I. Acid Blue 1, 7, 9, 15, 22, 23, 27, 29, 40, 43, 55, 59, 78, 80, 81, 90, 102, 104, 185, 254;

C.I. Acid Red 1, 4, 8, 14, 18, 21, 26, 35, 37, 249, 257, 289;

C.I. Acid Yellow 1, 3, 4, 11, 12, 13, 14, 19, 23, 25, 34, 38, 41, 42, 53, 55, 61, 76, 79;

C.I. Reactive Blue 1, 2, 3, 4, 5, 7, 8, 9, 13, 14 15, 17, 18, 19, 20, 21, 25, 26, 27, 28, 29, 31, 32, 33, 34, 37, 38, 39, 40, 41, 43, 44, 46;

C.I. Reactive Red 1, 2, 3, 4, 5, 6, 8, 11, 12, 13, 15, 16, 19, 20, 21, 22, 23, 24, 29, 31, 32, 33, 34, 35, 36, 37, 38, 39, 40, 41, 42, 43, 45, 46, 49, 58, 59, 63, 64, 180;

C.I. Reactive Yellow 1, 2, 4, 6, 7, 11, 12, 13, 14, 15, 16, 17, 18, 23, 24, 25, 26, 27, 37, and 42.

The above anionic dyes are not limited to one type, but a mixture of two types or more may be used to adjust the color tone. The anionic dye may be preferably contained in the ink in the range of 0.1 to 15 wt % and more preferably 1 to 10% based on the total weight of the ink.

The polyvalent metal salt contained in the third ink includes, for example, magnesium nitrate, calcium nitrate, aluminum nitrate, magnesium chloride, calcium chloride, magnesium acetate, calcium acetate, iron (II) acetate and copper (II) acetate, but the present invention is not limited to them. Not only one of the above polyvalent metal salts, but also a mixture of two types or more may be used to adjust the color tone. The polyvalent metal salt may be preferably contained in the ink in the range of 0.1 to 15 wt % and more preferably 1 to 10% based on the total weight of the ink.

<Pigment in the Fourth Ink in Ink Set A>

Next, pigments contained in the fourth ink will be described. Any pigment can be used so long as it has moderate color tone and color density, whether it is known or newly synthesized.

Specifically, C.I. Pigment Yellow 1, 2, 3, 12, 13, 14, 16, 17, 73, 74, 75, 83, 93, 95, 97, 98, 114, 128, 129, 151, 154, 195;

C.I. Pigment Red 5, 7, 12, 48 (Ca), 48 (Mn), 57 (Ca), 57:1, 57 (Sr), 112, 122, 123, 168, 184, 202;

C.I. Pigment Blue 1, 2, 3, 15:3, 15:34, 16, 22, 60; and

C.I. Vat Blue 4, 6 are enumerated, but the invention is not limited to them.

<Pigment Dispersant in the Fourth Ink in Ink Set A>

The anionic dispersant contained in the fourth ink is described. The dispersant is used to stably disperse the pigment in ink. As the dispersant, macromolecular dispersants, surfactant dispersants or the like are enumerated. As specific examples of macromolecular dispersants, there are polyacrylates, styrene-acrylate copolymers, styrene methacrylate copolymers, styrene acrylate acrylic ester copolymers, styrene-maleate copolymers, acrylic ester maleate copolymers, styrene methacrylsulfonate copolymers, vinyl naphthalene maleate copolymers, alpha-naphthalene sulfonate formalin condensates, polyvinyl pyrrolidone, polyethylene glycol and polyvinyl alcohols. In general, the weight average molecular weight ranges from 1000 to 30000 and the aced valence ranges preferably from 100 to 430. As the surfactant type dispersants, lauryl benzene sulfonates, lauryl sulfonates, lauryl benzene carboxylates, lauryl naphthalene sulfonates, aliphatic amine salts and polyethylene oxide condensates are enumerated. It is preferable to use such a dispersant in a ratio of pigment weight: dispersant weight=10:5 to 10:0.5.

Not only one of the above pigments but also a mixture of two types or more may be used to adjust the color tone. The pigment may be preferably contained in the ink in the range of 0.1 to 20 wt % and more preferably 1 to 15% based on the total weight of the ink.

<Cationic Dye in the Fourth Ink in Ink Set B>

The cationic dye contained in the fourth ink in Ink set B will be described. Any cationic dye can be used so long as it has moderate color tone and color density, whether it is known or newly synthesized.

Examples of such a cationic dye include

C.I. Basic Yellow 1, 2, 11, 13, 14, 19, 21, 25, 32, 33, 36, 51;

C.I. Basic Orange 2, 15, 21, 22;

C.I. Basic Red 1, 2, 9, 12, 13, 37, 38, 39, 92;

C.I. Basic Violet 1, 3, 7, 10, 14;

C.I. Basic Blue 1, 3, 5, 7, 9, 19, 24, 25, 26, 28, 29, 45, 54, 65;

C.I. Basic Green 1, 4;

C.I. Basic Brown 1, 12; and

C.I. Basic Black 2, 8, but the invention is not limited to these.

Not only one of the above cationic dyes, but also a mixture of two types or more may be used to adjust the color tone. The cationic dye may preferably be contained in the ink in the range of 0.1 to 15 wt % and more preferably 1 to 15% based on the total weight of the ink.

<Monohydric Alcohol in the Second Ink in Ink Set A or in the Fourth Ink in Ink Set B>

As an alcohol to be contained in the second ink of set A, or in the fourth ink of Ink set B is preferably such a monohydric alcohol that strips the dispersant supporting the dispersibility of the pigment in the fourth Ink (A) from its surface, or that functions as a dehydrating agent, in Ink set B, to strip off the water molecules surrounding the self-dispersible carbon black of the water molecule to support the dispersibility. Such alcohols include, though are not particularly limited to, highly water-soluble methyl alcohol, ethyl alcohol, n-propyl alcohol, isopropyl alcohol, n-butyl alcohol, sec-butyl alcohol, tert-butyl alcohol and isobutyl alcohol. The monohydric alcohol may preferably be contained in the ink in the range of 1 to 15 wt % and more preferably 2 to 10% based on the total weight of the ink.

Next, the solvent to be used in the first to the fourth inks will be described. As a solvent, the combined use of water and a water-soluble organic solvent is preferred.

Preferably, water to be used in the present invention is not ordinary water containing various ions, but deionized water. The water content is preferably in the range of 35 to 96% by weight based on the total weight of the aqueous ink.

Water-soluble organic solvents are used to adjust the ink viscosity to be suitable for use, and to prevent clogging in the nozzles of a recording head by slowing the drying of the ink or by enhancing the solubility of a coloring material. As specific examples, C1 to C5 alkyl alcohols such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethyl formamide and dimethyl acetamide; ketones or keto alcohols such as acetone and diacetone alcohols; ethers such as tetrahydrofuran and dioxane; oxyethylene or oxypropylene copolymers such as diethylene glycol, triethylene glycol, tetraethylene glycol, dipropylene glycol, tripropylene glycol, polyethylene glycol and polypropylene glycol; alkylene glycols of C2 to C6 alkylene groups such as ethylene glycol, propylene glycol, trimethylene glycol, triethylene glycol, 1, 2, 6-hexane triol and hexylene glycol; glycerol; trimethylol ethane, trimethylol propane; lower alkyl ethers such as ethylene glycol mono-methyl (or, ethyl) ether, diethylene glycol mono-methyl (or, ethyl) ether and triethylene glycol mono-methyl (or, ethyl) ether; lower dialkyl ethers such as ethylene glycol di-methyl (or, ethyl) ether, diethylene glycol di-methyl (or, ethyl) ether and triethylene glycol di-methyl (or, ethyl) ether; alkanol amines such as monoethanol amine, diethanol amine and triethanol amine; sulfolane, N-methyl-2-pyrrolidone, 2-pyrrolidone and 1,3-dimethyl-2-imidazolidinone are enumerated. Water-soluble organic solvents as mentioned above can be used either singly or as a mixture.

Besides, to stabilize the solubility of the dye or the dispersibility of carbon black in ink by maintaining pH of the first to fourth inks, a pH adjusting agent may be contained in the ink. As specific examples of pH adjusting agents, hydroxides such as lithium hydroxide, sodium hydroxide, potassium hydroxide and ammonium hydroxide; acids such as sulfuric acid, hydrochloric acid and acetic acid; sulfates such as lithium sulfate, sodium sulfate, potassium sulfate and ammonium sulfate; carbonates such as lithium carbonate, sodium carbonate, sodium hydrogencarbonate, potassium carbonate, potassium hydrogencarbonate, potassium sodium carbonate, ammonium carbonate and ammonium hydrogencarbonate; phosphates such as lithium phosphate, monosodium phosphate, disodium phosphate, trisodium phosphate, monopotassium phosphate, dipotassium phosphate, tripotassium phosphate, monoammonium phosphate, diammonium phosphate and triammonium phosphate; acetates such as lithium acetate, sodium acetate, potassium acetate and ammonium acetate are enumerated.

These salts may be singly added to the ink, but combined use of two or more of them is more preferable. The total amount of these salts in the ink is preferably in the range of 0.1 to 10% by weight and more preferably 1 to 8% by weight. By taking such a range, the pH of ink can be kept constant and the solubility stability of the aqueous dye in the ink can be maintained. Besides, within such a range, no precipitation of salt crystal would occur which may cause nozzle clogging.

Furthermore, in addition to the above constituents, it may be used if necessary various conventional additives such as viscosity controllers, antimolds, antiseptics, antioxidants, anti-foaming agents, surfactants, and nozzle drying inhibitors such as urea.

The physical characteristics (at about 25° C.) of the ink to be used in the present invention are as follows: pH is in the range of 2 to 12 and more preferably 3 to 10, surface tension is 10 to 60 mN/m (dyn/cm), more preferably, 15 to 50 mN/m (dyn/cm), and viscosity is preferably in the range of 1 to 30 mPa·s (cps) and more preferably 1 to 10 mPa·s (cps).

<Second Aspect of the Invention>

In the preceding aspect, four color inks or more are used, but it is possible to constitute a three color ink system by omitting the first ink from Ink set B. In this case, by ejecting three color inks of the second to fourth inks in an overlapping manner on a recording medium, an image can be recorded where bleeding between individual color inks is alleviated.

Also, it is possible to constitute a three color ink system by omitting the first ink from Ink set A, in this case, however, the dispersant in the fourth ink is not necessarily anionic. As the dispersant for dispersing the pigment into the liquid medium, in addition to the above anionic dispersants, cationic dispersants can be used. As the cationic dispersant, one can use polymers obtainable by polymerizing vinyl monomers, at least part of which is constituted by a cationic monomer, for example, salts of tertiary amine monomers and quaternary ammonium compounds. Examples of such compounds include N,N-dimethyl aminoethyl methacrylate [$CH_2=C(CH_3)—COO—C_2H_4N(CH_3)_2$], N,N-dimethyl aminoethyl acrylate [$CH_2=CH—COO—C_2H_4N(CH_3)_2$], N,N-dimethyl aminopropyl methacrylate [$CH_2=C(CH_3)—COO—C_3H_6N(CH_3)_2$], N,N-dimethyl aminopropyl acrylate [$CH_2$=CH—COO—$C_3H_6N(CH_3)_2$], N,N-dimethyl acrylamide [$CH_2$=CH—CON($CH_3$)$_2$], N,N-dimethyl methacrylamide [$CH_2$=C($CH_3$)—CON($CH_3$)$_2$], N,N-dimethyl aminoethyl acrylamide [$CH_2$=CH—CONH—$C_2H_4$N($CH_3$)$_2$], N,N-dimethyl aminoethyl methacrylamide [$CH_2$=C($CH_3$)—CONH—$C_2H_4$N($CH_3$)$_2$], N,N-dimethyl aminopropyl acrylamide [$CH_2$=$CH_3$—CONH—$C_3H_6$N($CH_3$)$_2$] and N,N-dimethyl aminopropyl methacrylamide [$CH_2$=C($CH_3$)—CONH—$C_3H_6$N($CH_3$)$_2$].

To form salts of tertiary amines, acids such as hydrochloric acid, sulfuric acid, acetic acid and the like can be used. To form quaternary ammonium compounds, methyl chloride, dimethyl sulfate, benzyl chloride, and epichlorohydrine are enumerated. Among these, methyl chloride and dimethyl sulfate are preferable for preparing a dispersant in the present invention. Salts of tertiary amines or quaternary ammonium compounds as mentioned above behave as cations in water and are stably solubilized in an acidic region under a neutralized state. The content of such a monomer in a copolymer is preferably in the range of 20 to 60% by weight.

As examples of other monomers which can constitute the above cationic macromolecular dispersants, 2-hydroxyethyl methacrylate, acrylate esters with a hydroxy group such as acrylate esters having a side chain of a long ethylene oxide chain, hydrophobic monomers such as styrene monomers and water-soluble monomers soluble in water of about pH 7 such as acrylamides, vinyl ethers, vinyl pyrrolidones, vinyl pyridines and vinyl oxazolines are enumerated. As hydrophobic monomers, styrene, styrene derivatives, vinyl naphthalene, vinyl naphthalene derivatives, alkyl esters of (meth)acrylic acid, and acrylonitrile are used. In a macromolecular dispersant obtained by copolymerization, a water-soluble monomer is used within the range of 15 to 35% by weight to make the copolymer stably present in a water solution, and a hydrophobic monomer is preferably used within the range of 20 to 40% by weight to enhance the pigment-dispersing activity of the copolymer.

The recording method of the present invention uses three inks or more to form an image by an ink jet process. Any conventional process is applicable to the recording method of the present invention. Namely, there are an ink-jet recording method in which an ink droplet is ejected by the action of a bubble in the ink formed by applied thermal energy, and a recording method which ejects a liquid droplet by using the mechanical vibration of a piezoelectric element, for both of which the ink set of the present invention is suited.

Next, one example of ink-jet recording apparatus suitable for the ink set of the invention is described.

Figure 2:
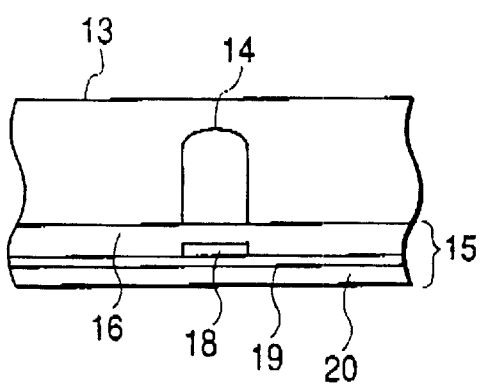
FIG. 2 is a horizontal sectional view of one example of the head in an ink-jet recording apparatus.

First, FIGS. 1 and 2 show an example of a constitution of the main part of an ink-jet recording apparatus which utilizes thermal energy. FIG. 1 is a sectional view of a head 13 taken along the ink flow path, and FIG. 2 is a sectional view taken along line 2—2 of FIG. 1. The head 13 is prepared by gluing a substrate with a heat generating element 15 to a board of glass, ceramic, silicon, polysulfone or plastic board on which a flow path (nozzle) 14 for ink is provided. The substrate with a heat generating element 15 comprises a protection layer 16-1 made of silicon oxide, silicon nitride or silicon carbide, an outermost protection layer 16-2 made of a metal or metal oxide thereof such as platinum or platinum oxide, electrodes 17-1 and 17-2 made of aluminum, gold or aluminum—copper alloy, a heat generating resistor layer 18 made of a high melting point material such as hafnium boride, tantalum nitride or aluminum tantalate, a heat accumulation layer 19 made of silicon oxide or aluminum oxide, and a substrate 20 made of a heat-radiative material such as silicon, aluminum or aluminum nitride.

Figure 12:
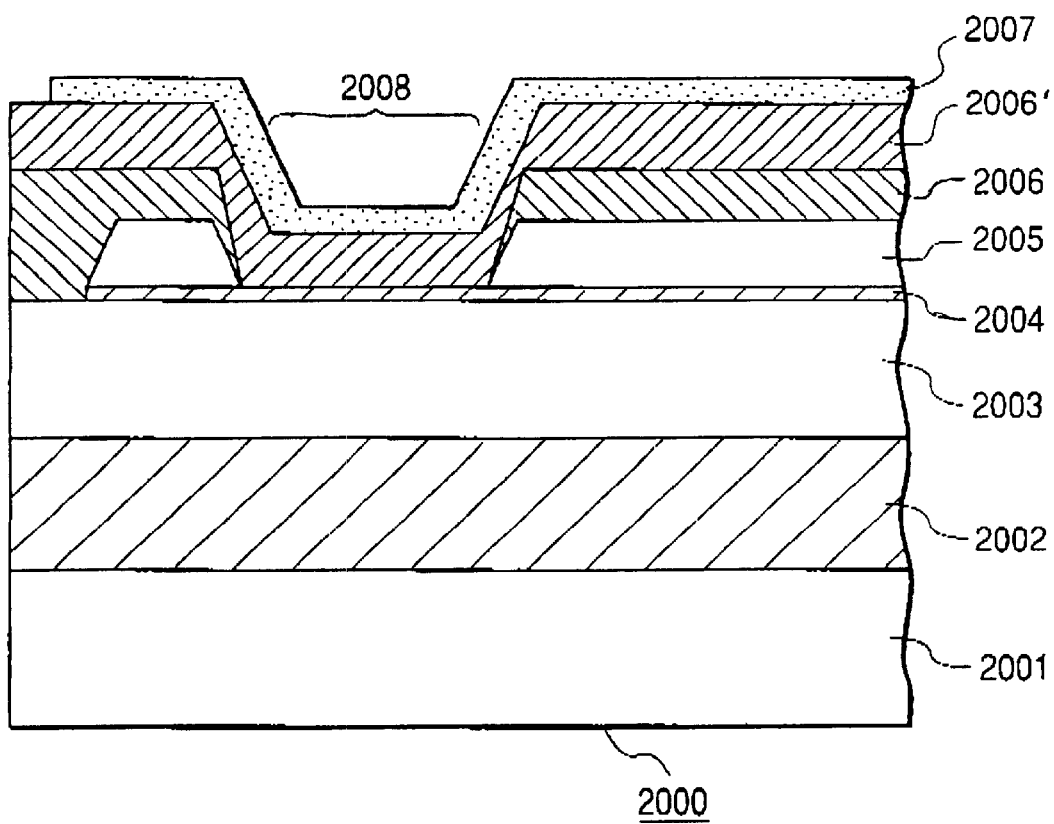
FIG. 12 is a sectional view of a part of the basic body of a recording head taken along the ink flow path.

FIG. 12 is a partly sectional view of a recording head in an ink-jet recording apparatus according to the present invention taken along the ink flow path of the substrate with an electrothermal converting element having a heat-generating resistor element formed thereon. Namely, the portion positioned between two opposed ends of an electrode layer 2005 constituting the electrode wiring shown in FIGS. 12 which is not covered with an electrode layer of a heat-generating resistor layer 2004 forms a heat-generating resistor.

Figure 3:
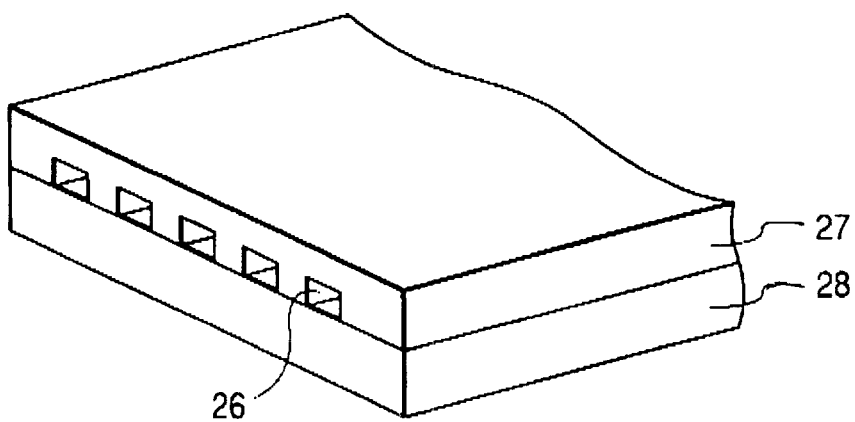
FIG. 3 is an external perspective view of a multiplex head of the head shown in FIG. 1.

When a pulse-shaped electric signal is applied to the electrodes 17-1 and 17-2 of the above head 13, the region (heater) designated with n of the substrate with the heat-generating element 15 rapidly develops heat, bubbles are generated in the ink 21 contacting this surface, a meniscus 23 protrudes, the ink 21 is ejected through a nozzle 14 of the head 13 to form an ink droplet 24 which flies toward a recording medium 25. FIG. 3 shows the outer appearance of one example of a multi-head in which many heads shown in FIG. 1 are arranged. This multi-head is formed by stacking a polysulfone 27 with a multi-nozzle 26 and a heat-generating head 28 similar to the one described in FIG. 1.

In FIG. 12, numerals 2001 and 2002 denote a silicon substrate and a heat regenerative layer made of an oxide film, numerals 2003, 2004, 2005 and 2006 denote a SiO film serving also for heat regeneration, an inter-layer film, an electrode layer as wiring made of a metallic material such as Al, Al—Si or Al—Cu and a protective layer functioning also as an insulating layer made of a SiO film, a SiN film or the like and numeral 2007 denotes a top protective layer for keeping the protective layer 2006 from a physical or chemical shock accompanying the heat generation of a heat-generating resistor. Besides, numeral 2008 denotes a heat action part where the heat generated at heat-generating resistors of the heat-generating resistor layer 2004 acts on the ink.

Figure 4:
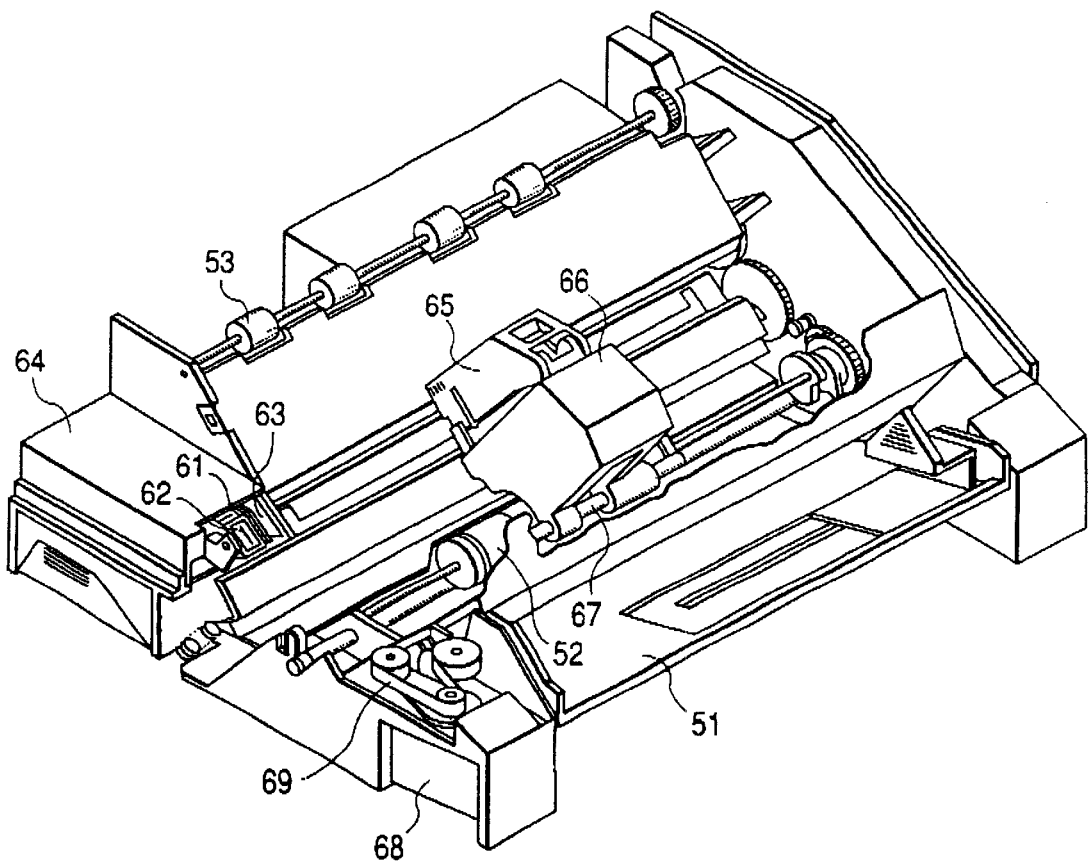
FIG. 4 is a schematic perspective view of one example of an ink-jet recording apparatus.

FIG. 4 shows one example of the ink-jet recording apparatus in which such a head is incorporated. In FIG. 4, reference numeral 61 denotes a blade as a wiping member which is supported with and fixed to a blade-supporting member at one end and has a cantilever-like shape. The blade 61 is arranged in a position adjacent to the recording region of a recording head 65. In this example, the blade is held in a projecting form in the path along which the recording head 65 moves.

Reference numeral 62 denotes a cap for a ejection opening of the recording head 65, the cap is arranged in a home position adjacent to the blade 61 and to move in the direction perpendicular to the moving direction of the recording head 65 so as to cap the ink-ejecting opening when touching it. Numeral 63 denotes an ink-absorber provided adjacent to the blade 61, which is held in the moving path of the recording head 65 in a projecting form like the blade 61. The above blade 61, cap 62 and ink-absorber 63 constitute an ejection recovery portion 64, and the blade 61 and the ink-absorber 63 serve to remove moisture and dust on the ink-ejecting opening.

Reference numeral 65 denotes a recording head. The head contains a means for generating ink-ejecting energy and performs recording by ejecting ink towards a recording medium opposite to the ink-ejecting opening. Numeral 66 denotes a carriage for carrying the recording head 65 so that it can move. The carriage 66 is engaged with a guide shaft 67 in a slidable manner, and a part of the carriage 66 is connected to a belt 69 (not shown in the figure) driven by a motor 68. Thus the carriage 66 can move along the guide shaft 67, and the recording head 65 can move in the recording region and the region adjacent thereto.

Reference numeral 51 denotes a paper feeding portion for inserting a recording medium and numeral 52 denotes a paper-delivery roller driven by a motor not shown in the figure. With such an arrangement, the recording medium is fed to the position opposite to the ink ejecting opening of the recording head 65 and conveyed to a paper output portion provided with a paper output roller 53 as recording proceeds. In the above arrangement, while the recording head returns to its home position after recording, the cap 62 of the ejection recovery portion 64 evacuates from the moving path of the recording head, but the blade 61 is projecting in the moving path. As a result, the ink ejecting opening of the recording head 65 is wiped.

The cap 62 moves into the moving path of the recording head 65 in a projecting manner to touch the ejection opening of the head 65 for capping. While the recording head 65 is moving from its home position to the recording start position, the cap 62 and the blade 61 take the same position as when wiping is carried out. As a result, the ejecting opening of the head 65 is wiped even during this movement. The recording head returns to its home position not only after completion of recording and during ejection recovery, but also returns to the home position adjacent to the recording region during moving in the recording region for recording, at prescribed intervals. With this movement, the above wiping is also carried out.

Figure 5:
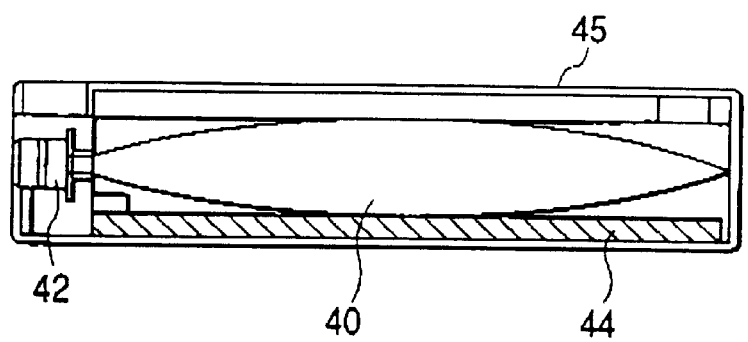
FIG. 5 is a vertical sectional view of one example of an ink cartridge.

FIG. 5 shows one example of an ink cartridge for storing ink for feeding ink to the recording head through an ink feeding member, such as a tube. In the drawing, reference numeral 40 denotes a member constituting the ink cartridge 45, an ink storage portion such as an ink bag, whose tip is equipped with a rubber stopper 42. The ink in the ink bag 40 can be fed to the recording head by inserting a needle (not shown in the figure) into the stopper 42. Numeral 44 denotes an ink absorber for receiving waste ink. For the ink storage portion, its surface in contact with ink is preferably made of polyolefin, particularly polyethylene.

Figure 6:
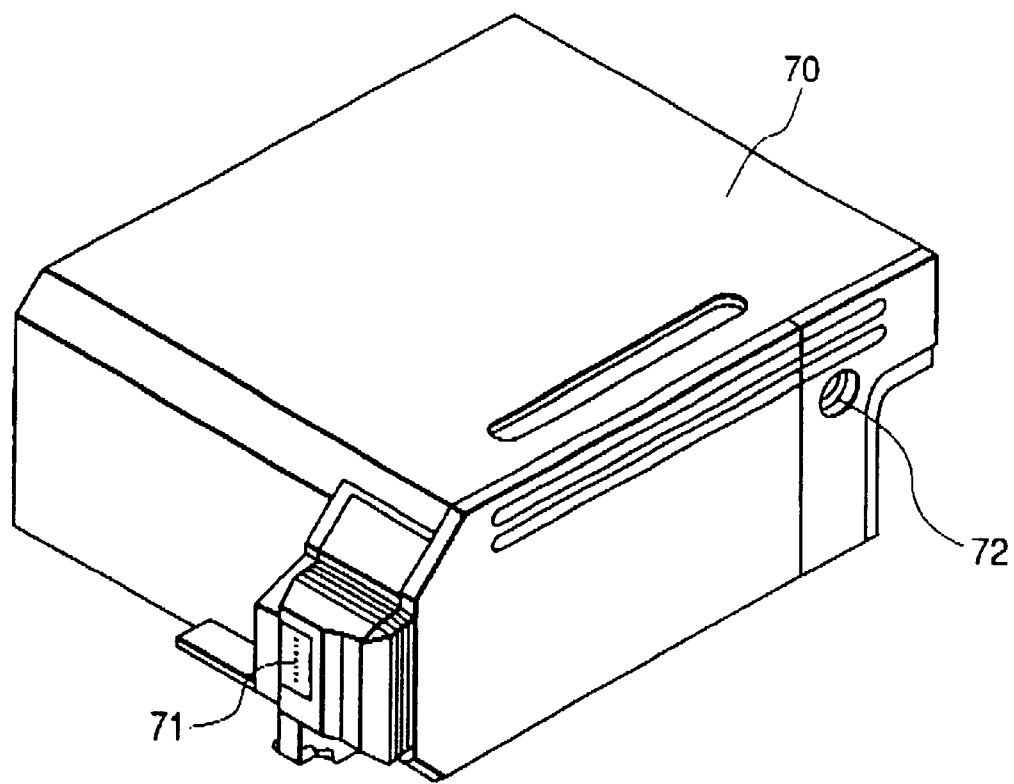
FIG. 6 is a perspective view of one example of a recording unit.

The ink-jet recording apparatus for use in the present invention is not limited to the aforementioned type in which an ink cartridge is not furnished as an integral part of the head, as shown in FIG. 6. The type in which the above two are integrated into one part is also preferably used.

In FIG. 6, reference numeral 70 denotes a recording unit which contains an ink storage portion for storing ink, for example, an ink absorber. In the arrangement of the above unit, ink in the ink absorber is ejected as an ink droplet from a head portion 71 having multiple orifices in it. As a material for the ink absorber, polyurethane is preferably used in the present invention.

An integral constitution in which no ink absorber is used and the ink storage portion is an ink bag having a spring within it may be used.

Numeral 72 denotes an opening for connecting the inside of the cartridge with air. This recording unit 70 is used in place of the recording head 65 shown in FIG. 4 and detachably attached to the carriage 66.

As another embodiment, there is an on-demand ink-jet recording head, comprising a nozzle forming substrate with multiple nozzles, a pressure generating element made of a piezoelectric material and a conductive material disposed opposite the nozzle and ink filling around this pressure generating element, for displacing the pressure generating element by an applied voltage and ejecting ink droplets from the nozzle. One exemplary configuration of such a recording head as the main part of the recording apparatus is shown in FIG. 7.

The head is constituted of: ink flow path 80 leading to the ink chamber (not shown); orifice plate 81 to eject an ink droplet of the desired volume; and vibration plate 82 which applies a pressure directly to the ink: piezoelectric element 83 which is connected with the vibration plate 82 and is deformed by the electric signals; and base plate 83 to hold and fix the orifice plate 81, the vibration plate 82, etc.

Figure 7:
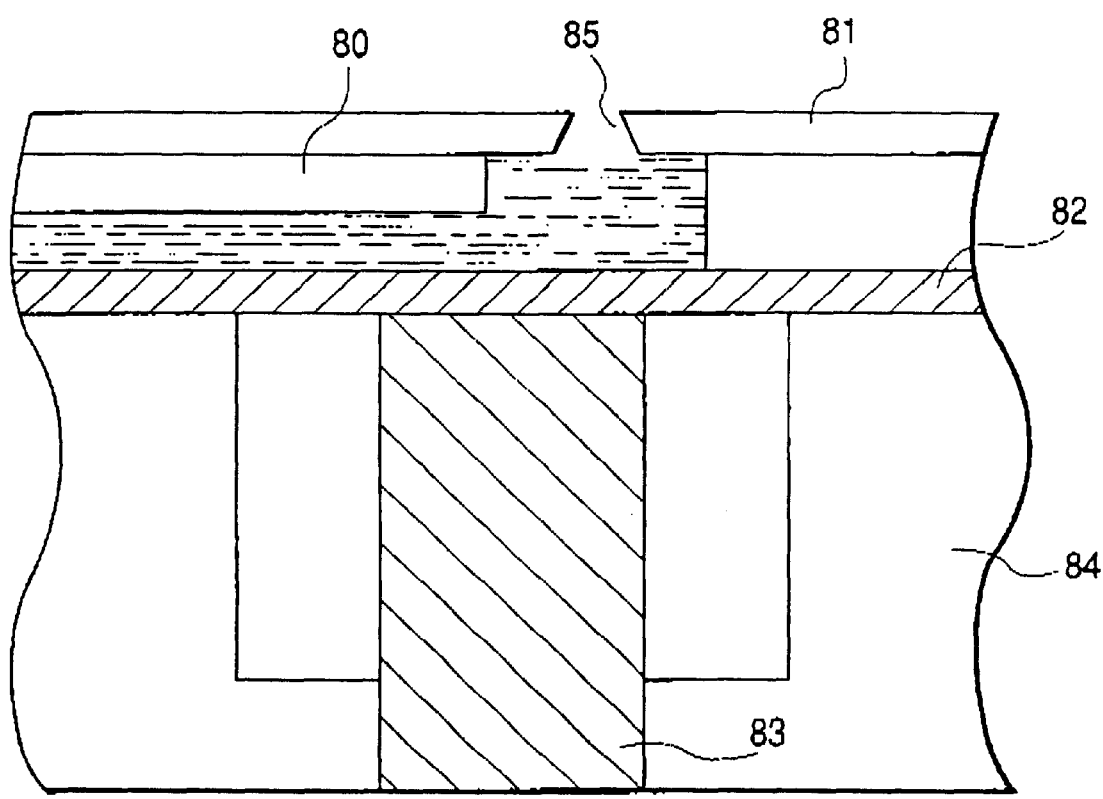
FIG. 7 is a schematic sectional view of one exemplary configuration of an ink-jet recording head utilizing mechanical energy.

In FIG. 7, the ink flow path 80 is made from a photosensitive resin; the orifice plate 81 which is made of a metal such as stainless steel and nickel; the ejection orifice 85 which is formed by making a hole in the orifice plate 81 by electrocasting or press processing; the vibration plate 82 which is made from a metal film such as stainless steel, nickel and titanium and a highly elastic resin film; and the piezoelectric element 83 which is made from a dielectric material such as barium titanate and PZT.

The recording head of the above constitution works as follows: when a pulse-like voltage is given to the piezoelectric element 83, a strain stress is generated, the energy of which deforms the vibration plate connected with the piezoelectric element 83 to apply pressure vertically to the ink in the ink flow path 80, and an ink droplet (not shown) is discharged from the orifice 85 of the orifice plate 81 to perform recording.

Such a recording head is incorporated into the recording apparatus similar to the one shown in FIG. 4. Detailed action of the parts of the recording apparatus may be the same as mentioned above.

Figure 8:
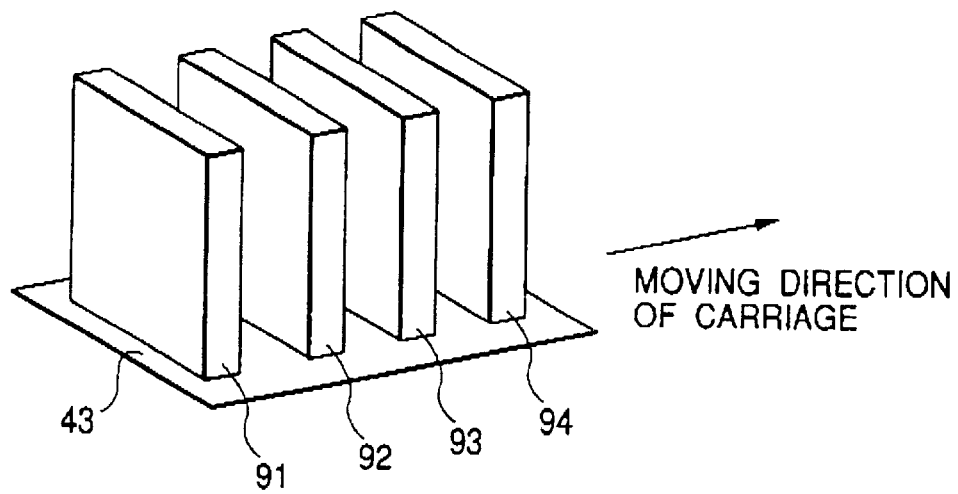
FIG. 8 is a perspective view of a recording unit where multiple recording heads are arranged.

When a color image is formed by the image forming method of the invention, a recording apparatus in which four recording heads are arranged on the carriage 43, for example, as shown in FIG. 3, is used. FIG. 8 shows one example of such an arrangement. Numerals 91, 92, 93 and 94 denote the respective recording head for ejecting a first ink, a second ink, a third ink and a fourth ink. These heads, disposed in the above recording apparatus, eject individual color inks in response to recording signals.

Figure 9:
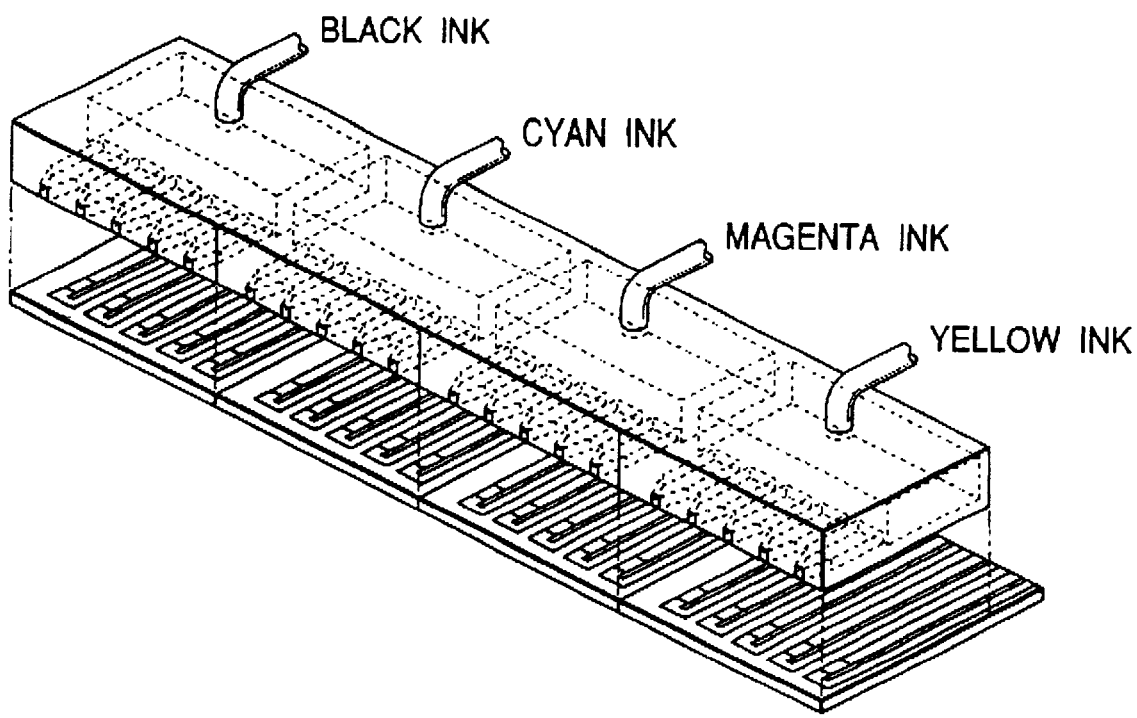
FIG. 9 is a perspective view of another recording head used in the present invention.

Although four recording heads are used in FIG. 8, the present invention is not limited to this. As shown in FIG. 9, use of one single recording head having separated liquid flow paths corresponding to the first, second, third and fourth inks is also preferable.

Figure 10:
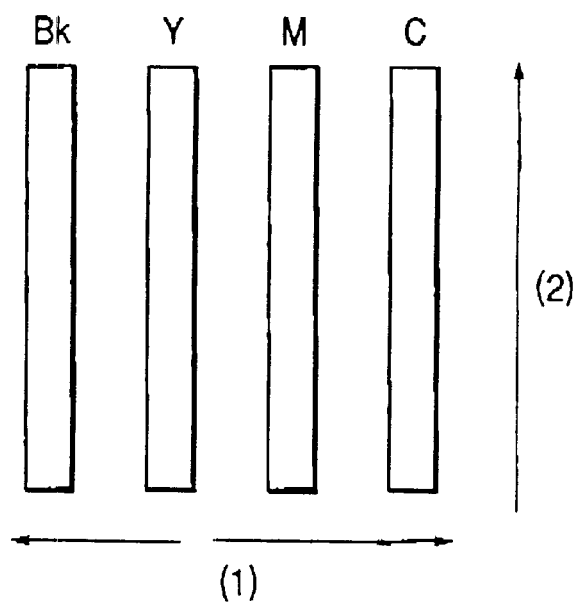
FIG. 10 is an illustration of a first exemplary configuration of a recording head.
Figure 11:
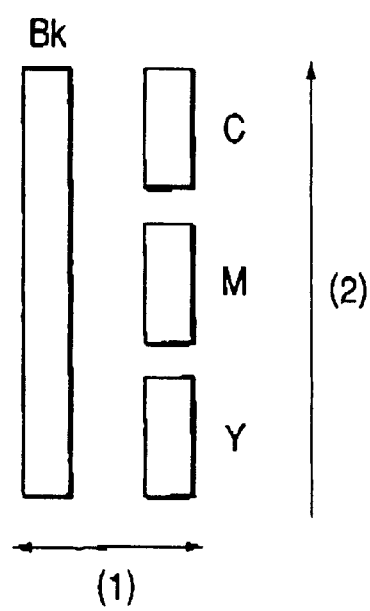
FIG. 11 is an illustration of a second exemplary configuration of a recording head.

As specific exemplary configurations of ink-jet recording head arrangements suitably used in the present invention, two types are shown in FIGS. 10 and 11.

In FIGS. 10 and 11, numerals Y, M, C and Bk denote the respective recording heads for ejecting individual color inks of yellow, magenta, cyan and black. The recording heads are arranged respectively on the carriage as shown in FIG. 7 (depending on the configuration). Individual recording heads are disposed in a recording apparatus as mentioned above and eject the respective color inks in response to recording signals. Here, individual recording heads are moved in the direction of the arrowhead (1) by means of a carriage and a recording medium is moved in the direction of the arrowhead (2) by means of a paper delivery roller or the like.

In the first exemplary configuration of FIG. 10, recording heads for Bk, Y, M and C are disposed in parallel on a carriage. The second exemplary configuration of FIG. 11 comprises a recording head for black ink and recording heads disposed in parallel with this black ink recording head and in series with each other for Y, M and C.

Besides, in FIG. 10, the carriage is fixed and a recording medium is moved in the direction of the arrowhead (2) by means of a paper delivery roller to form a so-called line printer.

As described above, according to the present invention, a clear color image, almost free of bleeding and good in printing grade of printed characters, is provided.

EXAMPLES

The present invention is described more specifically by Examples and Comparative Examples which by no means limit the present invention, and variations may be made without departing from the spirit and scope of the invention. "Parts" and "%" in this specification are based on weight, unless otherwise stated.

<Preparation of Pigment>

Carbon Black 1

Ten grams of carbon black, having a specific surface area of 230 m²/g and DBP oil absorption of 70 mL/100 g, and 3.06 g of 3-amino-N-ethylpyridinlum bromide were well mixed with 72 g of water, to which 1.62 g of nitric acid was added dropwise, and the mixture was stirred at 70° C. A couple of minutes later, a solution of 1.07 g of sodium nitrite dissolved in 5 g of water was added to the above mixture, and the mixture was stirred for 1 hour. The resultant slurry was filtered with Toyo Roshi No. 2 filter paper (manufactured by Advantec). The pigment particles thus prepared were thoroughly washed with water and dried at 110° C. in an oven, to which water was added to prepare a 10% aqueous dispersion of the cationic carbon black having the following hydrophilic group directly bonded to the surface (carbon black 1).

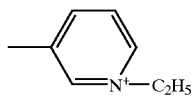

Pigment Dispersion 1

| | |
|---|---|
| Styrene/acrylate copolymer (acid value: 200, average molecular weight: 7,000) | 5.5 parts |
| Monoethanolamine | 1.0 parts |
| Ion-exchanged water | 67.5 parts |
| Diethylene glycol | 5.0 parts |

Mixture of the above ingredients was heated at 70° C. in a water bath, to completely dissolve the resin portion.

The above solution was incorporated with 20 parts of C.I. pigment red 122 and 1.0 parts of isopropyl alcohol, subjected to premixing for 30 minutes, and dispersion-treated under the following conditions:

Dispersing machine: Sand grinder
Milling medium: Glass beads (diameter: 1 mm)
Packing ratio of milling media: 50% (by volume)
Milling time: 3 hours The above solution was further subjected to centrifugation (12,000 rpm, 20 minutes), to remove coarse particles and prepare Pigment dispersion 1.

Pigment Dispersion 2

Pigment dispersion 2 was prepared in the same manner as the above Pigment dispersion 1 except that C.I. Pigment Yellow 93 was used instead of C.I. Pigment Red 122.

Pigment Dispersion 3

Pigment dispersion 3 was prepared in the same manner as the above Pigment dispersion 1 except that C.I. Pigment Blue 15:3 was used instead of C.I. Pigment Red 122.

Pigment Dispersion 4

| | |
|---|---|
| Styrene/acrylate copolymer (average molecular weight: 7,000) | 5.0 parts |
| Monoethanolamine | 1.0 parts |
| Ion-exchanged water | 68.0 parts |
| Diethylene glycol | 5.0 parts |

Mixture of the above ingredients was heated at 70° C. in a water bath, to completely dissolve the resin portion.

The above solution was incorporated with 20 parts of carbon black (Mitsubishi Chemical, MCF88) and 1.0 parts of isopropyl alcohol, subjected to premixing for 30 minutes, and dispersion under the following conditions:

Dispersing machine: Sand grinder
Milling medium: Zirconium beads (diameter: 1 mm)
Packing ratio of milling media: 50% (by volume)
Milling time: 3 hours The above solution was further subjected to centrifugation (12,000 rpm, 20 minutes), to remove coarse particles and prepare a dispersion.

Examples 1 to 6 and Comparative Examples 1 to 3

Ink sets of Examples 1 to 6 and Comparative Examples 1 to 4 were prepared with various combination of black, yellow, magenta, and cyan inks.

Each ink was prepared by dissolving and filtering the following ingredients, where the black ink of Examples 1 to 6 and Comparative Examples 1 to 3, the magenta ink of Example 4 and the yellow ink of Example 5 were filtered under pressure by a microfilter having a pore size of 3 μm (manufactured by Fuji film), and the other inks were filtered under pressure by a microfilter having a pore size of 0.2 μm (manufactured by Fuji film).

Ink Set of Example 1 (Ink Set B of the First Aspect)

| | |
|---|---|
| Black ink (the first ink) | |
| Carbon black 1 | 4 parts |
| Glycerin | 8 parts |
| Trimethylol propane | 5 parts |
| Hexylene glycol | 4 parts |
| Water | 78 parts |
| Yellow ink (the second ink) | |
| Projet Fast Yellow-2 (Zeneca) | 2.5 parts |
| Glycerin | 5 parts |
| Diethylene glycol | 5 parts |
| 2-propanol | 5 parts |
| Urea | 5 parts |
| Lithium hydroxide | 0.2 parts |
| Water | 77.3 parts |
| Magenta ink (the fourth ink) | |
| C.I. Basic Red 2 | 2 parts |
| Glycerin | 8 parts |
| Diethylene glycol | 5 parts |
| 2-propanol | 4 parts |
| Water | 81 parts |
| Cyan ink (the third ink) | |
| C.I. Direct Blue 199 | 2 parts |
| Glycerin | 8 parts |
| Diethylene glycol | 5 parts |
| 2-propanol | 4 parts |

-continued

| | |
|---|---|
| Magnesium nitrate (hexahydrate) | 7 parts |
| Water | 74 parts |

Ink Set for Example 2 (Ink Set B of the First Aspect)

| | |
|---|---|
| Black ink (First ink) | |
| Carbon black 1, above described | 4 parts |
| Glycerin | 5 parts |
| Diethylene glycol | 5 parts |
| 2-pyrrolidone | 5 parts |
| Acetylenol EH (Kawaken Fine Chemical) | 0.3 parts |
| Water | 80.7 parts |
| Yellow ink (Fourth ink) | |
| C.I. Basic Yellow 92 | 2.5 parts |
| Diethylene glycol | 10 parts |
| Ethylene glycol | 5 parts |
| Ethanol | 4 parts |
| Water | 78.5 parts |
| Magenta ink (Third ink) | |
| C.I. Acid Red 289 | 2 parts |
| Glycerin | 5 parts |
| Thiodiglycol | 5 parts |
| Trimethylol propane | 5 parts |
| Ethanol | 4 parts |
| Magnesium nitrate (hexahydrate) | 2 parts |
| Water | 77 parts |
| Cyan ink (Second ink) | |
| Projet Fast Cyan 2 (Zeneca) | 3 parts |
| Glycerin | 8 parts |
| Diethylene glycol | 5 parts |
| Ethanol | 4 parts |
| Sodium hydroxide | 0.2 parts |
| Water | 79.8 parts |

Ink Set of Example 3 (Ink Set B of the First Aspect)

| | |
|---|---|
| Black ink (First ink) | |
| Carbon black 1, above described | 3 parts |
| Trimethylol propane | 5 parts |
| Diethylene glycol | 10 parts |
| 2-pyrrolidone | 5 parts |
| Acetylenol EH (Kawaken Fine Chemical) | 0.2 parts |
| Water | 76.8 parts |
| Yellow ink (Third ink) | |
| C.I. Acid Yellow 23 | 2 parts |
| Diethylene glycol | 10 parts |
| Ethylene glycol | 5 parts |
| Trimethylol propane | 3 parts |
| Acetylenol EH (Kawaken Fine Chemical) | 0.3 parts |
| Calcium nitrate (tetrahydrate) | 5 parts |
| Water | 74.7 parts |
| Magenta ink (Fourth ink) | |
| C.I. Basic Red 92 | 2 parts |
| Glycerin | 9 parts |
| Diethylene glycol | 5 parts |
| Ethanol | 5 parts |
| Water | 80 parts |
| Cyan ink (Second ink) | |
| Projet Fast Cyan 2 (Zeneca) | 3 parts |
| Glycerin | 10 parts |
| Diethylene glycol | 5 parts |
| Acetylanol EH (Kawaken Fine Chemical) | 0.3 parts |

-continued

| | |
|---|---|
| Sodium hydroxide | 0.2 parts |
| Water | 81.5 parts |

Ink Set of Example 4 (Ink Set A of the First Aspect)

| | |
|---|---|
| Black Ink (First ink of Ink set A) | |
| Carbon black 1, above described | 3 parts |
| Trimethylol propane | 5 parts |
| Diethylene glycol | 10 parts |
| Glycerin | 5 parts |
| Acetylenol EH (Kawaken Fine Chemical) | 0.2 parts |
| Water | 76.8 parts |
| Yellow ink (Third ink of Ink set A) | |
| C.I. Acid Yellow 23 | 2 parts |
| Diethylene glycol | 10 parts |
| Ethylene glycol | 5 parts |
| Trimethylol propane | 3 parts |
| Acetylenol EH (Kawaken Fine Chemical) | 0.3 parts |
| Calcium nitrate (tetrahydrate) | 5 parts |
| Water | 74.7 parts |
| Magenta ink (Fourth ink of Ink set A) | |
| Pigment dispersion 1, above described | 20 parts |
| Glycerin | 15 parts |
| Diethylene glycol | 10 parts |
| Acetylenol EH (Kawaken Fine Chemical) | 0.3 parts |
| Water | 54.7 parts |
| Cyan ink (Second ink of Ink set A) | |
| Projet Fast Cyan 2 (Zeneca) | 3 parts |
| Glycerin | 10 parts |
| Diethylene glycol | 5 parts |
| Acetylenol EH (Kawaken Fine Chemical) | 0.3 parts |
| Sodium hydroxide | 0.2 parts |
| Water | 81.5 parts |

Ink Set of Example 5 (Ink Set A)

| | |
|---|---|
| Black ink (First ink of Ink set A) | |
| Carbon black 1, above described | 4 parts |
| Glycerin | 5 parts |
| Thiodiglycol | 5 parts |
| 2-pyrrolidone | 5 parts |
| Acetylenol EH (Kawaken Fine Chemical) | 0.3 parts |
| Water | 80.7 parts |
| Yellow ink (Fourth ink of Ink set A) | |
| Pigment dispersion 2, above described | 20 parts |
| Glycerin | 15 parts |
| Diethylene glycol | 10 parts |
| Acetylenol EH (Kawaken Fine Chemical) | 0.3 parts |
| Water | 54.7 parts |
| Magenta ink (Third ink of Ink set A) | |
| C.I. acid red 289 | 2 parts |
| Glycerin | 5 parts |
| Thiodiglycol | 5 parts |
| Trimethylol propane | 5 parts |
| Ethanol | 4 parts |
| Magnesium nitrate (hexahydrate) | 2 parts |
| Water | 77 parts |
| Cyan ink (Second ink of Ink set A) | |
| Projet Fast Cyan 2 (Zeneca) | 3 parts |
| Glycerin | 8 parts |
| Diethylene glycol | 5 parts |
| Ethanol | 4 parts |

-continued

| | |
|---|---|
| Sodium hydroxide | 0.2 parts |
| Water | 79.8 parts |

Ink Set of Example 6 (Ink Set A)

| | |
|---|---|
| Black ink (First ink of Ink set A) | |
| Carbon black 1, above described | 3 parts |
| Trimethylol propane | 5 parts |
| Diethyleneglycol | 10 parts |
| 2-pyrrolidone | 5 parts |
| Acetylenol EH (Kawaken Fine Chemical) | 0.2 parts |
| Water | 76.8 parts |
| Yellow ink (Third ink of Ink set A) | |
| C.I Acid Yellow 23 | 2 parts |
| Diethylene glycol | 10 parts |
| Ethylene glycol | 5 parts |
| Trimethylol propane | 3 parts |
| Acetylenol EH (Kawaken Fine Chemical) | 0.3 parts |
| Calcium nitrate (tetrahydrate) | 5 parts |
| Water | 74.7 parts |
| Magenta ink (Second ink of Ink set A) | |
| Projet Fast magenta 2 (Zeneca) | 2.5 parts |
| Glycerin | 5 parts |
| Diethylene glycol | 10 parts |
| 2-propanol | 5 parts |
| Urea | 5 parts |
| Sodium hydroxide | 0.1 parts |
| Sodium sulfate | 0.1 parts |
| Water | 72.3 parts |
| Cyan ink (Fourth ink of Ink set A) | |
| Pigment dispersion 3, above described | 20 parts |
| Glycerin | 15 parts |
| Diethylene glycol | 10 parts |
| Acetylenol EH (Kawaken Fine Chemical) | 0.3 parts |
| Water | 54.7 parts |

Ink Set of Comparative Example 1

| | |
|---|---|
| Black ink | |
| Carbon black 1, above described | 4 parts |
| Glycerin | 8 parts |
| Trimethylol propane | 5 parts |
| 1,5-pentanediol | 5 parts |
| Water | 78 parts |
| Yellow ink | |
| Projet Fast Yellow-2 | 2.5 parts |
| Glycerin | 5 parts |
| Diethylene glycol | 5 parts |
| 2-propanol | 5 parts |
| Urea | 5 parts |
| Lithium hydroxide | 0.2 parts |
| Water | 77.3 parts |
| Magenta ink | |
| C.I. Acid Red 289 | 2 parts |
| Glycerin | 8 parts |
| Diethylene glycol | 5 parts |
| 2-propanol | 4 parts |
| Water | 81 parts |
| Cyan ink | |
| C.I. Direct Blue 199 | 2 parts |
| Glycerin | 8 parts |
| Diethylene glycol | 5 parts |
| 2-propanol | 4 parts |

-continued

| | |
|---|---|
| Magnesium nitrate (hexahydrate) | 7 parts |
| Water | 74 parts |

Ink Set of Comparative Example 2
Black Ink

The black ink for Comparative Example 2 was prepared using the above Pigment dispersion 4 and the following ingredients. The mixture was stirred at 5° C. for 3 hours, and filtered under pressure with a membrane filter having a pore size of 3.0 μm (manufactured by Fuji film).

| | |
|---|---|
| Pigment dispersion 4, above described | 15 parts |
| Glycerin | 5 parts |
| Diethylene glycol | 15 parts |
| 30% aqueous solution of styrene/acrylate copolymer (average molecular weight: 7,000, neutralized with monoethanolamine, rate of neutralization: 110%) | 50 parts |
| Acetylenol EH (Kawaken Fine Chemical) | 0.2 parts |
| Water | 14.8 parts |
| Yellow ink | |
| C.I. Acid Yellow 23 | 2 parts |
| Glycerin | 5 parts |
| Ethylene glycol | 10 parts |
| 2-propanol | 4 parts |
| Calcium nitrate (tetrahydrate) | 4 parts |
| Water | 75 parts |
| Magenta ink | |
| C.I. Acid Red 289 | 2 parts |
| Glycerin | 8 parts |
| Diethylene glycol | 5 parts |
| 2-propanol | 4 parts |
| Magnesium nitrate (hexahydrate) | 6 parts |
| Water | 75 parts |
| Cyan ink | |
| C.I. Direct Blue 199 | 2 parts |
| Glycerin | 8 parts |
| Diethylene glycol | 5 parts |
| 2-propanol | 4 parts |
| Magnesium nitrate (hexahydrate) | 7 parts |
| Water | 74 parts |

Ink Set of Comparative Example 3
Black Ink

The same one as used for Comparative Example 2

| | |
|---|---|
| Yellow ink | |
| C.I. Acid Yellow 23 | 2 parts |
| Glycerin | 5 parts |
| Ethylene glycol | 10 parts |
| Acetylenol EH (Kawaken Fine Chemical) | 2 parts |
| Calcium nitrate (tetrahydrate) | 4 parts |
| Water | 77 parts |
| Magenta ink | |
| C.I. Acid Red 289 | 2 parts |
| Glycerin | 8 parts |
| Diethylene glycol | 5 parts |
| Acetylenol EH (Kawaken Fine Chemical) | 2 parts |
| Magnesium nitrate (hexahydrate) | 6 parts |
| Water | 77 parts |
| Cyan ink | |
| C.I. Direct Blue 199 | 2 parts |
| Glycerin | 8 parts |

-continued

| | |
|---|---|
| Diethylene glycol | 5 parts |
| Acetylenol EH (Kawaken Fine Chemical) | 2 parts |
| Magnesium nitrate (hexahydrate) | 7 parts |
| Water | 76 parts |

<Evaluation Methods and Criteria>

Each ink set of Examples 1 to 6 according to the present invention, and Comparative Examples 1 to 3 was set in a color ink jet printer (Canon, BJC-600J), an ink jet recording apparatus having an on-demand multiple recording head, which ejects the ink by applied thermal energy according to the recording signal. Performance evaluation was carried out on items (1) to (10) described below. The performance items (1) to (6) related to bleeding, and (7) to (10) to print quality. Two types of recording media were used for the evaluation, PB PAPER (copying paper, Canon) and 4024 PAPER (copying paper, Xerox). The evaluation results are given in Table 1.

(1) to (6): Evaluation of Bleeding
(1) Bleeding Between the Black and Yellow Inks On each of the above two types of recording media, first a solid black image was printed with the black ink and immediately after, a yellow solid image was printed with the yellow ink to abut the black image. The boundaries between the different color parts were visually observed, and evaluated for bleeding, based on the following criterion;

A: No bleeding was observed in the boundary
B: Slight bleeding was observed
C: Notable bleeding was observed.

(2) Bleeding Between the Black and Magenta Inks
The bleeding between the black and magenta inks was evaluated in the same manner as in the above (1) by the same criterion.

(3) Bleeding Between the Black and Cyan Inks
The bleeding between the black and cyan inks was evaluated in the same manner as in the above (1) by the same criterion.

(4) Bleeding Between the Yellow and Magenta Inks
The bleeding between the yellow and magenta inks was evaluated in the same manner as in the above (1) by the same criterion.

(5) Bleeding Between the Yellow and Cyan Inks
The bleeding between the yellow and cyan inks was evaluated in the same manner as in the above (1) by the same criterion.

(6) Bleeding Between the Magenta and Cyan Inks
The bleeding between the magenta and cyan inks was evaluated In the same manner as in the above (1) by the same criterion.

(7) to (10): Evaluation of Print Quality
Alphabets and numerals were printed on each of the above two types of recording media with each ink, left for at least 1 hour, and observed visually and microscopically to evaluate their quality (edge sharpness and feathering from the character), based on the following standards. Items (7), (8), (9) and (10) are the print quality of black, yellow, magenta and cyan inks, respectively.

A: Character edges are sharp and show no whisker-like feathering
B: Character edges show whisker-like feathering to some extent
C: Character edges show notable whisker-like feathering

TABLE 1

| | | Evaluation results | | | | | | | | | |
|---|---|---|---|---|---|---|---|---|---|---|---|
| | | Bleeding | | | | | Print quality | | | | |
| | | (1) Bk-Y | (2) Bk-M | (3) Bk-C | (4) Y-M | (5) Y-C | (6) M-C | (7) Bk | (8) Y | (9) M | (10) C |
| Example 1 | Canon PB Paper | A | A | A | A | A | A | A | A | A | A |
| | Xerox 4024 Paper | A | A | A | A | A | A | A | A | A | A |
| Example 2 | Canon PB Paper | A | A | A | A | A | A | A | A | A | A |
| | Xerox 4024 Paper | A | A | A | A | A | A | A | A | A | A |
| Example 3 | Canon PB Paper | A | A | A | A | A | A | A | A | A | A |
| | Xerox 4024 Paper | A | A | A | A | A | A | A | A | A | A |
| Example 4 | Canon PB Paper | A | A | A | A | A | A | A | A | A | A |
| | Xerox 4024 Paper | A | A | A | A | A | A | A | A | A | A |
| Example 5 | Canon PB Paper | A | A | A | A | A | A | A | A | A | A |
| | Xerox 4024 Paper | A | A | A | A | A | A | A | A | A | A |
| Example 6 | Canon PB Paper | A | A | A | A | A | A | A | A | A | A |
| | Xerox 4024 Paper | A | A | A | A | A | A | A | A | A | A |
| Comparative Example 1 | Canon PB Paper | A | A | A | C | A | C | A | A | A | A |
| | Xerox 4024 Paper | A | A | A | C | A | C | A | A | A | A |
| Comparative Example 2 | Canon PB Paper | A | A | A | C | C | C | A | A | A | A |
| | Xerox 4024 Paper | A | A | A | C | C | C | A | A | A | A |
| Comparative Example 3 | Canon PB Paper | A | A | A | A | A | A | A | C | C | C |
| | Xerox 4024 Paper | A | A | A | A | A | A | A | C | C | C |

As shown in Table 1, each ink set of the present invention prevents, or very efficiently reduces, bleeding between the different color inks. It is also shown that each ink by itself gives images of high quality.

With respect to the ink set of Comparative Example 3, penetrability of each of the yellow, magenta and cyan inks Into the recording medium has been greatly improved by adding Acetylenol EH.-

Thus bleeding between the different color inks was alleviated. Print quality, however, was insufficient because of their high penetrability.

What is claimed is:

1. An ink set for ink-jet recording of a color image on a recording medium, comprising:
   (1) a first ink comprising a monohydric alcohol and an anionic dye which aggregates on contact with a liquid containing a polyvalent metal salt;
   (2) a second ink comprising a polyvalent metal ion and an anionic dye which does not aggregate even when coexisting with the polyvalent metal salt; and
   (3) a third ink comprising an aqueous liquid, a pigment and an anionic dispersant for dispersing the pigment in the liquid.

2. An ink set for ink-jet recording of a color image on a recording medium, comprising:
   (1) a first ink comprising a self-dispersible carbon black with a cationic hydrophilic group bonded directly or through another atomic group to the surface thereof;
   (2) a second ink comprising a monohydric alcohol and an anionic dye which aggregates when the second ink contacts a liquid containing a polyvalent metal ion;
   (3) a third ink comprising a polyvalent metal ion and an anionic dye which does not aggregate even when coexisting with the polyvalent metal ion; and
   (4) a fourth ink comprising a pigment and an anionic dispersant for dispersing the pigment in the liquid.

3. An ink set for ink-jet recording of a color image on a recording medium, comprising:
   (1) a first ink comprising a self-dispersible carbon black with a cationic hydrophilic group bonded to the surface thereof directly or through another atomic group;
   (2) a second ink comprising an anionic dye which aggregates when the second ink contacts a liquid containing a polyvalent metal ion;
   (3) a third ink comprising a polyvalent metal salt and an anionic dye which does not aggregate even when coexisting with a polyvalent metal ion; and
   (4) a fourth ink comprising a cationic dye and a monohydric alcohol.

4. The ink set according to claim 2 or 3, wherein the cationic hydrophilic group in the first ink is one selected from the following formulas:

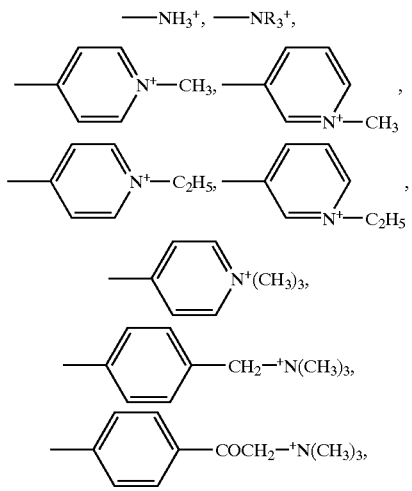

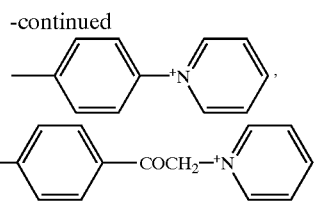

wherein R denotes a C1 to C12 alkyl group, a substituted or unsubstituted phenyl group or a substituted or unsubstituted naphthyl group.

5. The ink set according to claim 2 or 3, wherein the other atomic group is a C1 to C12 alkyl group, a phenylene group which may have a substituent or a naphthalene group which may have a substituent.

6. An ink-jet recording method for forming a multi-color image comprising a step of:
   ejecting three color inks by an ink-jet process, wherein the three inks respectively correspond to the first ink, the second ink and the third ink constituting the ink set according to claim 1.

7. An ink-jet recording method for forming a multi-color image comprising a step of:
   ejecting four color inks by an ink-jet process, wherein the four inks respectively correspond to the first ink, the second ink, the third ink and the fourth ink constituting the ink set according to claim 2 or 3.

8. The ink-jet recording method according to claim 6, wherein the ink is ejected by applying thermal energy to the ink.

9. The ink-jet recording method according to claim 7, wherein the ink is ejected by applying thermal energy to the ink.

10. The ink-jet recording method according to claim 6, wherein the ink is ejected by application of mechanical energy to the ink.

11. The ink-jet recording method according to claim 7, wherein the ink is ejected by application of mechanical energy to the ink.

12. A recording unit comprising: a first ink container, a second ink container and a third ink container respectively containing the first ink, the second ink and the third ink constituting the ink set according to claim 1 and an ink-jet head for ejecting the ink contained in each ink container.

13. A recording unit comprising: a first ink container, a second ink container, a third ink container and a fourth ink container containing the first ink, the second ink, the third ink and the fourth ink constituting the ink set according to claim 2 or 3 and an ink-jet head for ejecting the ink contained in each ink container.

14. An ink-jet recording apparatus comprising: a first ink container, a second ink container and a third ink container respectively containing the first ink, the second ink and the third ink constituting the ink set according to claim 1 and an ink-jet head for ejecting the ink contained in each ink container.

15. An ink-jet recording apparatus comprising: a first ink container, a second ink container, a third ink container and a fourth ink container respectively containing the first ink, the second ink, the third ink and the fourth ink constituting the ink set according to claim 2 or 3 and an ink-jet head for ejecting the ink contained in each ink container.

16. A method for alleviating bleeding in a multi-color image in which different color regions are adjacent to each other, wherein the images are formed with at least two color inks among three color inks respectively corresponding to the first ink, the second ink and the third ink constituting the ink set according to claim 1.

17. A method for alleviating bleeding in a multi-color image in which different color regions are adjacent to each other, wherein the images are formed with at least two of four color inks respectively corresponding to the first ink, the second ink, the third ink and the fourth ink constituting the ink set according to claim 2 or 3.

* * * * *

UNITED STATES PATENT AND TRADEMARK OFFICE
CERTIFICATE OF CORRECTION

PATENT NO. : 6,460,987 B1  Page 1 of 1
DATED : October 8, 2002
INVENTOR(S) : Ryuji Katsuragi et al.

It is certified that error appears in the above-identified patent and that said Letters Patent is hereby corrected as shown below:

Column 5,
Lines 9 and 12, "When" should read -- ¶ When --;
Line 15, "In" should read -- ¶ In --;
Line 17, "As" should read -- ¶ As --; and
Lines 50-54,

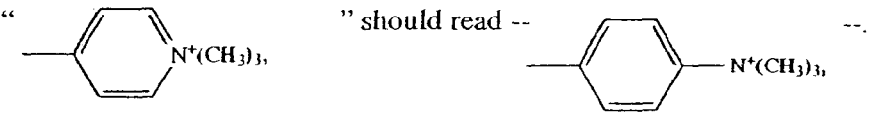

Column 13,
Line 53, "but" should read -- but the invention is --.

Column 23,
Line 59, "Glycerin      9 parts" should read -- Glycerin      8 parts --.

Column 28,
Line 65, "Into" should read -- into --; and
Line 67, "EH.–" should read -- EH. --.

Column 29,
Lines 57-60,

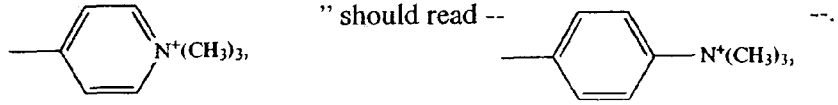

Signed and Sealed this

Fifth Day of August, 2003

JAMES E. ROGAN
*Director of the United States Patent and Trademark Office*